US007928603B2

(12) United States Patent
Ichikawa

(10) Patent No.: US 7,928,603 B2
(45) Date of Patent: Apr. 19, 2011

(54) POWER SUPPLY SYSTEM, VEHICLE USING THE SAME AND ITS CONTROL METHOD

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 198 days.

(21) Appl. No.: 12/227,847

(22) PCT Filed: Jul. 2, 2007

(86) PCT No.: PCT/JP2007/063620
§ 371 (c)(1),
(2), (4) Date: Dec. 1, 2008

(87) PCT Pub. No.: WO2008/007627
PCT Pub. Date: Jan. 17, 2008

(65) Prior Publication Data
US 2009/0243385 A1    Oct. 1, 2009

(30) Foreign Application Priority Data

Jul. 10, 2006  (JP) .................................. 2006-189214

(51) Int. Cl.
*H02J 1/12* (2006.01)
(52) U.S. Cl. ........................................................ 307/45
(58) Field of Classification Search .................... 307/43, 307/45, 46, 48, 52, 53, 80, 82, 85–87, 9.1, 307/10.1
See application file for complete search history.

(56) References Cited

U.S. PATENT DOCUMENTS

| 5,373,195 | A | 12/1994 | De Doncker et al. |
| 5,422,558 | A * | 6/1995 | Stewart ........................ 320/120 |
| 6,239,508 | B1 * | 5/2001 | Faris et al. ..................... 307/9.1 |
| 6,608,396 | B2 | 8/2003 | Downer et al. |
| 6,882,549 | B2 * | 4/2005 | Huggett et al. ................. 363/40 |
| 7,199,488 | B1 * | 4/2007 | Baker .............................. 307/43 |
| 2003/0107352 | A1 | 6/2003 | Downer et al. |

FOREIGN PATENT DOCUMENTS

| JP | A 6-276609 | 9/1994 |
| JP | A 8-33120 | 2/1996 |
| JP | A 8-79977 | 3/1996 |
| JP | A 2001-103740 | 4/2001 |
| JP | A 2003-209969 | 7/2003 |
| JP | A 2003-324989 | 11/2003 |
| JP | A 2005-94917 | 4/2005 |

* cited by examiner

*Primary Examiner* — Albert W Paladini
(74) *Attorney, Agent, or Firm* — Oliff & Berridge, PLC

(57) ABSTRACT

An integral element corresponding to a converter continues an integral operation even in a period in which a voltage converting operation of the converter is suspended. The integral output integrated in this period is invalid data. Therefore, if the invalid integral output is provided from the integral element at a time at which the voltage converting operation of the converter is resumed, it follows that the converter would be controlled by an irrelevant control value. Therefore, as described above, the voltage converting operation control unit applies a reset signal to the integral element to zero-clear the stored integral output.

14 Claims, 13 Drawing Sheets

POWER SUPPLY SYSTEM, VEHICLE USING THE SAME AND ITS CONTROL METHOD

TECHNICAL FIELD

The present invention relates to a power supply system having a plurality of electric storage units and a corresponding plurality of voltage converting units, to a vehicle provided with the system, and to a control method thereof. More specifically, the present invention relates to a technique of suspending voltage converting operation of the voltage converting unit in accordance with required power.

BACKGROUND ART

Recently, in consideration of environmental issues, vehicles using electric motors as driving power sources such as electric vehicles, hybrid vehicles and fuel cell electric vehicles have been attracting attention. Such a vehicle is provided with an electric storage unit formed of a secondary battery or a capacitor, for converting kinetic energy to electric energy at the time of regenerative braking and for storing the same.

In such a vehicle having the electric motor as the driving power source, it is desirable to increase charge/discharge capacity of the electric storage unit, in order to attain higher running performance such as acceleration performance and per-charge mileage. As a method of increasing the charge/discharge capacity of the electric storage unit, a structure including a plurality of electric storage units has been proposed.

By way of example, U.S. Pat. No. 6,608,396 discloses an electrical motor power management system for providing desired high DC voltage level to a high voltage vehicle traction system. The electrical motor power management system includes: a plurality of power stages for providing DC power to at least one inverter, each stage including a battery and boost/buck DC-DC converter and connected in parallel; and a controller controlling the plurality of power stages such that batteries to the plurality of power stages are uniformly charged/discharged so that the plurality of power stages maintain output voltage to the at least one inverter.

Now, driving force required of a vehicle significantly varies dependent on the running condition. For instance, when the vehicle runs at a low speed or runs downhill, the required electric power is smaller than the sum of tolerable discharge electric powers of the plurality of electric storage units. In such a situation, it is desired to selectively stop voltage converting operation of the voltage converting unit (corresponding to the boost/buck DC-DC converter mentioned above) corresponding to a prescribed electric storage unit, thereby to reduce power conversion loss at the voltage converting unit.

In a power system including a plurality of electric storage units and a plurality of corresponding voltage converting units, each of the voltage converting units must perform the voltage converting operation in accordance with the status value of corresponding electric storage unit, and therefore, these converting units are configured to execute voltage converting operations in mutually independent control systems. Specifically, there are a plurality of control systems corresponding to the voltage converting units. Provision of the plurality of control systems allows execution of voltage converting operation at an optimal timing by each of the voltage converting units.

It is common to provide in each control system with a control element such as an integral element, which outputs a control value determined dependent on history. Such a control element calculates a control value in accordance with status value at each time point as well as with variation in status values in the past. Therefore, a power system involving intermittently executed voltage converting operations is susceptible to disturbance derived from such a control element.

Specifically, a control value output immediately after the voltage converting operation is resumed is influenced by status values that should not be used for calculation, such as variation in status values during last voltage converting operation or variation in status values occurred while the voltage converting operation was suspended.

As a result, before and after switching of the voltage converting units for executing the voltage converting operation, output voltage from a voltage converting unit could be discontinuous, possibly making instable the voltage supplied from the voltage converting unit to a load device.

DISCLOSURE OF THE INVENTION

The present invention was made to solve such a problem and its object is to provide a power supply system with improved stability of an operation mode in which the voltage control operation of a voltage converting unit is suspended in accordance with a power request, a vehicle mounting the system, as well as to a control method thereof.

According to an aspect, the present invention provides a power supply system, having a plurality of rechargeable electric storage units. The power supply system in accordance with the present invention includes a power line formed to allow transfer of electric power between a load device and the power supply system, and a plurality of voltage converting units provided between each of the plurality of electric storage units and the power line, each performing a voltage converting operation between the corresponding electric storage unit and the power line. Each of the voltage converting units executes the voltage converting operation in accordance with a control system including a history element outputting a control value determined dependent on history. The power supply system in accordance with the present invention further includes an operation mode selecting unit selecting an operation mode, in response to a power request from the load device, in which the voltage converting operation of at least one voltage converting unit included in the plurality of voltage converting units is suspended, and a voltage converting operation control unit controlling execution and suspension of the voltage converting operation of each of the plurality of voltage converting units based on a status value of corresponding one of the electric storage units, when the operation mode is selected. The voltage converting operation control unit sets, when the voltage converting operation is to be resumed at the suspended voltage converting unit, a prescribed initial value determined independent from the control value stored in the corresponding history element before resumption, to the corresponding history element.

According to the present invention, in the operation mode in which the voltage converting operation of at least one voltage converting unit among the plurality of voltage converting units is suspended, a prescribed initial value is set in the history element corresponding to the said voltage converting unit, when the suspended voltage converting unit resumes the voltage converting operation. The prescribed value is determined independent of the control value that has been stored in the corresponding history element before the restart of operation and, therefore, an invalid control value dependent on the history during suspension is not used in the control system governing the resumed voltage converting operation. Thus, the resumed voltage converting operation can be normalized independent of the control status of the period in which the voltage converting operation is suspended.

Preferably, the plurality of voltage converting units includes first and second voltage converting units, and the operation mode is a one-side suspended mode in which the voltage converting operation of one of the first and second voltage converting units is suspended and the voltage converting operation of the other is executed.

Preferably, the voltage converting operation control unit clears to zero the control value stored in the history element corresponding to the voltage converting unit that resumes the voltage converting operation.

Preferably, when the voltage converting unit for executing the voltage converting operation is to be switched from the first voltage converting unit to the second voltage converting unit, the voltage converting operation control unit sets, based on the control value stored in the history element corresponding to the first voltage converting unit, the prescribed initial value to the history element corresponding to the second voltage converting element, so that continuity of voltage converting operations by the first voltage converting unit and the second voltage converting unit is maintained before and after the switching.

Preferably, the history element includes an integral element.

Preferably, the history element includes a learning element that determines a learning value based on a status value of an object of control.

According to another aspect, the present invention provides a vehicle including any of the power supply systems described above and a driving force generating unit generating driving force, receiving the electric power supplied from the power supply system.

According to a still further aspect, the present invention provides a method of controlling a power supply system having a plurality of rechargeable electric storage units. The power supply system includes a power line formed to allow transfer of electric power between a load device and the power supply system, and a plurality of voltage converting units provided between each of the plurality of electric storage units and the power line, each performing a voltage converting operation between the corresponding electric storage unit and the power line, and each of the plurality of voltage converting units executes the voltage converting operation in accordance with a control system including a history element outputting a control value determined dependent on history. The control method includes the steps of: selecting an operation mode in which the voltage converting operation of at least one voltage converting unit included in the plurality of voltage converting units is suspended, in response to a power request from the load device; and controlling execution and suspension of the voltage converting operation of each of the plurality of voltage converting units based on a status value of corresponding one of the electric storage units, when the operation mode is selected. The controlling step includes the step of setting, when the voltage converting operation is to be resumed by the suspended voltage converting unit, a prescribed initial value determined independent from the control value stored in the corresponding history element before resumption, to the corresponding history element.

Preferably, the plurality of voltage converting units includes first and second voltage converting units, and the operation mode is a one-side suspended mode in which the voltage converting operation of one of the first and second voltage converting units is suspended and the voltage converting operation of the other is executed.

Preferably, the setting step includes the step of clearing to zero the control value stored in the history element corresponding to the voltage converting unit that resumes the voltage converting operation.

Preferably, the setting step includes the step of setting, when the voltage converting unit for executing the voltage converting operation is to be switched from the first voltage converting unit to the second voltage converting unit, based on the control value stored in the history element corresponding to the first voltage converting unit, the prescribed initial value to the history element corresponding to the second voltage converting element, so that continuity of voltage converting operations by the first voltage converting unit and the second voltage converting unit is maintained before and after the switching.

According to the present invention, it is possible to improve stability of the operation mode in which the voltage converting operation of a voltage converting unit is suspended in accordance with required power.

BEST MODES FOR CARRYING OUT THE INVENTION

Figure 1:
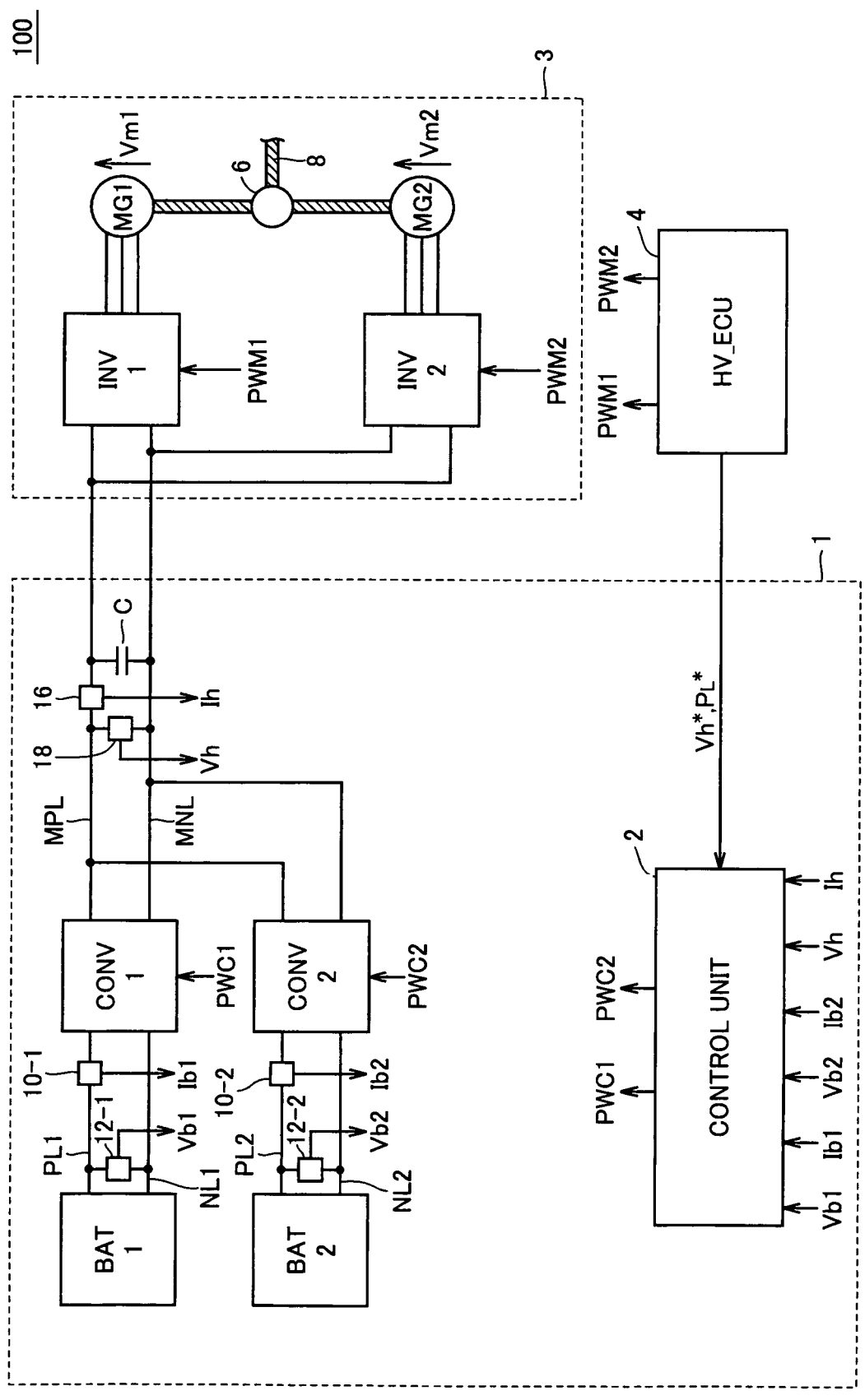
FIG. 1 is a schematic diagram showing a substantial portion of a vehicle provided with the power supply system in accordance with an embodiment of the present invention.

An embodiment of the present invention will be described in detail with reference to the figures. In the figures, the same or corresponding portions are denoted by the same reference characters, and description thereof will not be repeated.

Referring to FIG. 1, a schematic configuration of a vehicle 100 provided with the power supply system 1 in accordance with an embodiment of the present invention will be described.

In the present embodiment, a configuration in which electric power is transferred between power supply system 1 and a driving force generating unit 3 for generating the force for driving vehicle 100, as an example of the load device, will be described. Vehicle 100 runs as the driving force generated by driving force generating unit 3 receiving the electric power supplied from power supply system 1 is transmitted to wheels (not shown).

In the present embodiment, power supply system 1 including, as an example of the plurality of electric storage units, two electric storage units will be described. Power supply system 1 transfers DC power to/from driving force generating unit 3 through a main positive power line MPL and a main negative power line MNL.

Driving force generating unit 3 includes a first inverter INV1, a second inverter INV2, a first motor generator MG1 and a second motor generator MG2, and generates driving force in response to a switching command PWM1 or PWM2 from HV_ECU (Hybrid Vehicle Electronic Control Unit) 4.

Inverters INV1 and INV2 are connected in parallel to main positive power line MPL and main negative power line MNL, and transfer power to/from power supply system 1. Specifically, inverters INV1 and INV2 convert DC power received through main positive power line MPL and main negative power line MNL, respectively, to AC power and supply the AC power to motor generators MG1 and MG2. Further, inverters INV1 and INV2 may be configured to convert AC power generated by motor generators MG1 or MG2 receiving kinetic energy of vehicle 100 to DC power and to return the converted power as regenerative power to power supply system 1 at the time of regenerative braking. As an example, inverters INV1 and INV2 are formed of a bridge circuit including switching elements of three phases, and generate three-phase AC power by performing switching operation (opening/closing the circuit) in response to switching commands PWM1 and PWM2 from HV_ECU4, respectively.

Motor generators MG1 and MG2 are formed to be capable of generating rotation driving force, receiving the AC power supplied from inverters INV1 and INV2, respectively, and capable of generating AC power, receiving the rotation driving force from the outside. As an example, motor generators MG1 and MG2 are three-phase AC rotating electric machines including a rotor with embedded permanent magnets. Motor generators MG1 and MG2 are each coupled to a power transmitting mechanism 6, and transmit the generated driving force via a driving shaft 8 to wheels (not shown).

When driving force generating unit 3 is applied to a hybrid vehicle, motor generators MG1 and MG2 are also mechanically coupled to an engine (not shown) via power transmitting mechanism 6 or driving shaft 8. HV_ECU4 controls the driving force generated by the engine and driving force generated by motor generators MG1 and/or MG2 such that these attain an optimal ratio. When applied to such a hybrid vehicle, motor generators may be arranged such that one motor generator functions solely as an electric motor and the other motor generator functions solely as a generator.

By executing a program stored in advance, HV_ECU 4 calculates target torque values and target rotational speed of motor generators MG1 and MG2, based on signals transmitted from various sensors (not shown), running condition, rate of change in accelerator position, a stored map and the like. HV_ECU 4 generates switching commands PWM1 and PWM2 and applies these to driving force generating unit 3, so that the generated torque and rotational speed of motor generators MG1 and MG2 respectively attain the calculated target torque values and target rotational speed.

Further, HV_ECU 4 obtains back electromotive voltage values Vm1 and Vm2 generated in motor generators MG1 and MG2, based on the calculated target torque values and target rotational speed or on the actual torque values and actual rotational speed detected by various sensors (not shown), and outputs a requested voltage value Vh* determined by back electromotive voltage values Vm1 and Vm2 to power supply system 1. Specifically, when driving force generating unit 3 performs power running operation, HV_ECU 4 determines the requested voltage value Vh* that is larger than the back electromotive voltage values Vm1 and Vm2, so that electric power can be supplied from power supply system 1 to motor generator MG1 or MG2. On the contrary, when driving force generating unit 3 performs a regenerative operation, HV_ECU 4 determines the requested voltage value Vh* that is smaller than the back electromotive voltage value Vm1 and Vm2, so that electric power generated by motor generator MG1 or MG2 can be returned to power supply system 1.

Further, HV_ECU 4 calculates a required power value $P_L^*$ based on a product of the target torque value and the target rotational speed described above, or on a product of actual torque value and actual rotational speed, and outputs the value to power supply system 1. HV_ECU 4 notifies power supply system 1 of power request at driving force generating unit 3 such as the power running operation (positive value) and the regenerative operation (negative value), by changing the sign of required power value $P_L^*$.

Power supply system 1 includes a smoothing capacitor C, a supply current detecting unit 16, a supply voltage detecting unit 18, a first converter CONV1, a second converter CONV2, a first electric storage unit BAT1, a second electric storage unit BAT2, output current detecting units 10-1 and 10-2, output voltage detecting units 12-1 and 12-2, and a control unit 2.

Smoothing capacitor C is connected between main positive power line MPL and main negative power line MNL, and reduces fluctuation component (AC component) involved in the power supplied from converters CONV1 and CONV2.

Supply current detecting unit 16 is inserted in series to main positive power line MPL, detects a supply current value Ih to driving force generating unit 3, and outputs the result of detection to control unit 2.

Supply voltage detecting unit 18 is connected between main positive power line MPL and main negative power line MNL, detects a supply voltage value Vh to driving force generating unit 3, and outputs the result of detection to control unit 2.

Converters CONV1 and CONV2 are connected in parallel to main positive power line MPL and main negative power line MNL, and perform voltage converting operations between corresponding electric storage units BAT1 and BAT2 and main positive and negative power lines MPL and MNL, respectively. Specifically, converters CONV1 and CONV2 boost the discharge power from electric storage unit BAT1 and BAT2 to target voltage values, respectively, to generate supply power. As an example, converters CONV1 and CONV2 are formed to include a chopper circuit.

Electric storage units BAT1 and BAT2 are connected in parallel to main positive power line MPL and main negative power line MNL, through converters CONV1 and CONV2, respectively. By way of example, electric storage units BAT1 and BAT2 are implemented by rechargeable electric storage element such as a secondary battery including a nickel hydride battery or a lithium battery, or an electric double layer capacitor.

Output current detecting units 10-1 and 10-2 are each inserted to one of a pair of power lines, of pairs of power lines connecting electric storage units BAT1 and BAT2 to converters CONV1 and CONV2, respectively, detect output current values Ib1 and Ib2 across the input/output of electric storage units BAT1 and BAT2, and output the results of detection to control unit 2.

Output voltage detecting units 12-1 and 12-2 are connected between two power lines connecting electric storage unit BAT1 to converter CONV1 and two power lines connecting electric storage unit BAT2 to converter CONV2, respectively, detect output voltage values Vb1 and Vb2 of electric storage units BAT1 and BAT2, and output results of detection to control unit 2.

Based on the requested voltage value Vh* and required power value $P_L$* received from HV_ECU 4, supply current value Ih received from supply current detecting unit 16, supply voltage value Vh received from supply voltage detecting unit 18, output current values Ib1 and Ib2 received from output current detecting units 10-1 and 10-2, and output voltage values Vb1 and Vb2 received from output voltage detecting units 12-1 and 12-2, control unit 2 generates switching commands PWC1 and PWC2, respectively, in accordance with control structure that will be described later, and controls voltage converting operations of converters CONV1 and CONV2.

Particularly, control unit 2 is formed to allow selection of an operation mode in which the voltage converting operation by converter CONV1 or CONV2 is suspended in response to the required power value $P_L$* from driving force generating unit 3. Specifically, if the required power value $P_L$* from driving force generating unit 3 is smaller than the tolerable discharge power of electric storage unit BAT1 or BAT2, control unit 2 suspends the voltage converting operation of one of the converters, to reduce power conversion loss.

In power supply system 1 having two electric storage units, it is impossible to suspend converters CONV1 and CONV2 at one time. Therefore, this operation mode corresponds to a one-side suspended mode in which the voltage converting operation of one converter is suspended and the voltage converting operation of the other converter is executed.

In the one-side suspended mode, control unit 2 controls execution and suspension of voltage converting operation of each of converters CONV1 and CONV2, based on status values of electric storage units BAT1 and BAT2. Examples of status values of electric storage units BAT1 and BAT2 used here include output voltage values Vb1 and Vb2 of electric storage units BAT1 and BAT2, and remaining amounts (SOC: State Of Charge; hereinafter also simply referred to as "SOC") of electric storage units BAT1 and BAT2. Control unit 2 causes the converter corresponding to the electric storage unit having higher output voltage value or higher SOC to execute the voltage converting operation, and suspends voltage converting operation of the other converter.

By selecting the converter corresponding to the electric storage unit having higher output voltage value, it becomes possible to lessen generation of unwanted circulation current between electric storage units and to avoid extraordinary degradation or undesirable loss at the electric storage unit. By selecting the converter corresponding to the electric storage unit having higher SOC, it becomes possible to avoid degradation of electric storage unit caused by excessive lowering of SOC even when required power value $P_L$* from driving force generating unit 3 is relatively large. In the following, an example will be described in which a converter corresponding to the electric storage unit having higher output voltage value is selectively caused to execute the voltage converting operation.

Further, control unit 2 implements two mutually independent control systems, for controlling voltage converting operation in each of the converters CONV1 and CONV2 described above. Each of the control systems includes a history element that outputs a control value determined dependent on the history. In the embodiment of the present invention, a history element including an integral element is used as an example.

When the suspended converter resumes the voltage converting operation, control unit 2 sets a prescribed initial value, which is determined independent of a control value that has been stored in the corresponding history element before resumption, to the history element. By way of example, if execution of the voltage converting operation is to be switched from converter CONV1 to converter CONV2, control unit 2 sets the prescribed initial value to the history element corresponding to converter CONV2, and if execution of the voltage converting operation is to be switched from converter CONV1 to converter CONV2, control unit 2 sets the prescribed initial value to the history element corresponding to converter CONV1. In the embodiment of the present invention, as an example, "zero" is used without exception, regardless of the control value that has been stored in the corresponding history element before resumption. Specifically, control unit zero-clears the control value stored in the history element including the integral element.

In the embodiment of the present invention, driving force generating unit 3 corresponds to the "load device", main positive power line MPL and main negative power line MNL correspond to the "power line" and converters CONV1 and CONV2 correspond to the "plurality of voltage converting units."

Figure 2:
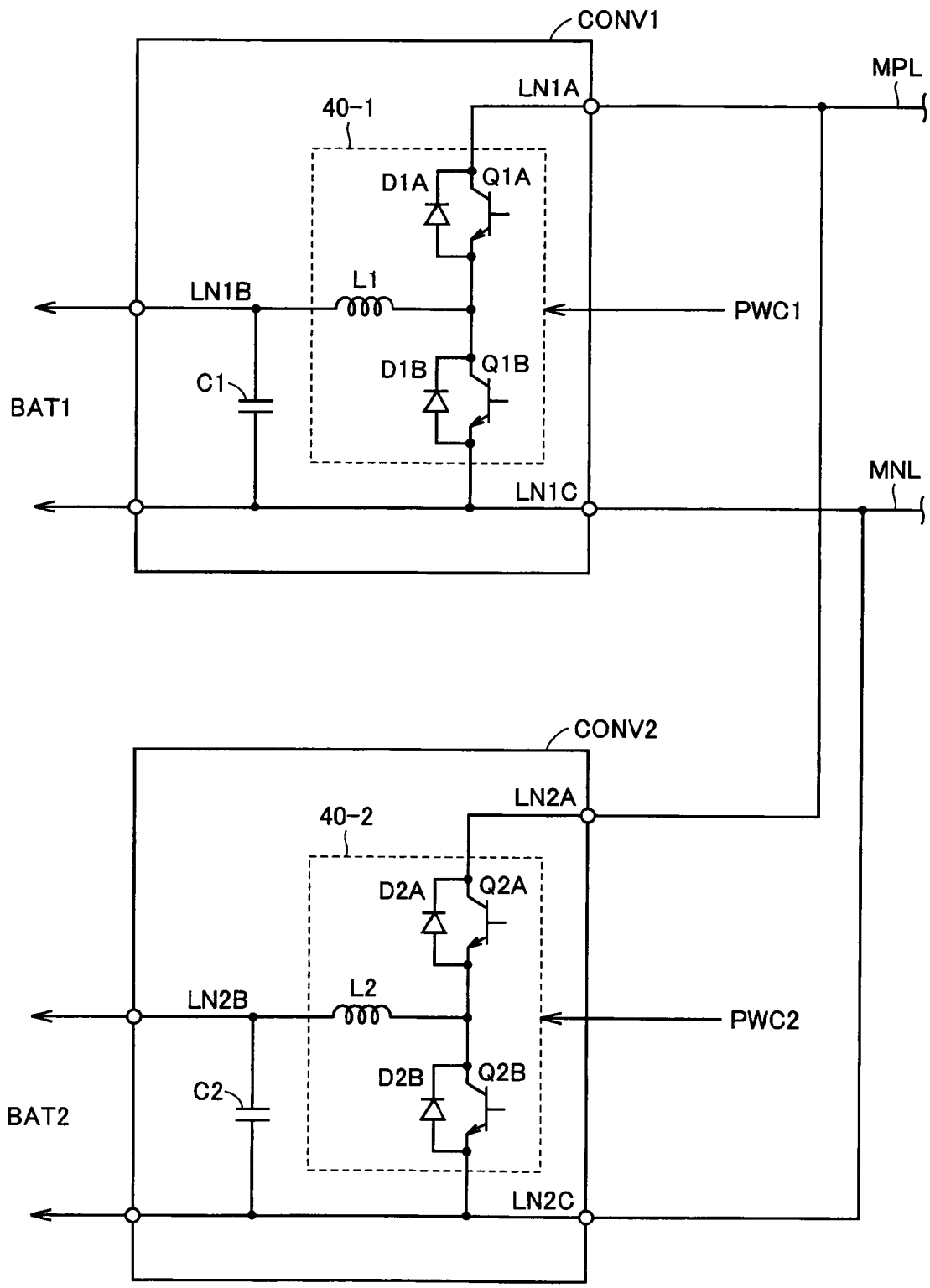
FIG. 2 is a schematic diagram of a converter in accordance with the embodiment of the present invention.

Referring to FIG. 2, schematic configuration of converters CONV1 and CONV2 in accordance with the embodiment of the present invention will be described.

Converter CONV1 consists of a chopper circuit 40-1 and a smoothing capacitor C1.

Chopper circuit 40-1 is capable of bi-directional power supply. Specifically, chopper circuit 40-1 is capable of boosting the discharge power from electric storage unit BAT1 and supplying the result to driving force generating unit 3 in response to switching command PWC1 from control unit 2 (FIG. 1), and also capable of bucking the regenerative power received from driving force generating unit 3 and supplying the result to electric storage unit BAT1. Chopper circuit 40-1 includes a positive line LN1A, a negative line LN1C, a line LN1B, transistors Q1A and Q1B as switching elements, diodes D1A and D1B, and an inductor L1.

Positive line LN1A has one end connected to the collector of transistor Q1A and the other end connected to the main positive line MPL. Negative line LN1C has one end connected to the negative side of electric storage unit BAT1 and the other end connected to main negative line MNL.

Transistors Q1A and Q1B are connected in series between positive line LN1A and negative line LN1C. Transistor Q1A has its collector connected to positive line LN1A and transistor Q1B has its emitter connected to negative line LN1C. Further, between the collector and emitter of transistors Q1A and Q1B, diodes D1A and D1B causing current flow from the emitter side to the collector side are connected, respectively. Further, inductor L1 is connected to a node between transistors Q1A and Q1B.

Line LN1B has one end connected to the positive side of electric storage unit BAT1, and the other end connected to inductor L1.

Smoothing capacitor C1 is connected between line LN1B and negative line LN1C, and reduces AC component involved in the DC voltage between line LN1B and negative line LN1C.

In the following, the voltage converting operation of converter CONV1 will be described. In a boosting operation, control unit 2 (FIG. 1) maintains transistor Q1A on, and turns on/off the transistor Q1B with a prescribed duty ratio. In the ON period of transistor Q1B, discharge current flows from electric storage unit BAT1 through line LN1B, inductor L1, transistor Q1A and positive line LN1A in this order to main positive line MPL. At the same time, pump current flows from electric storage unit BAT1 through lien LN1B, inductor L1, transistor Q1B and negative line LN1C in this order. Inductor L1 stores electromagnetic energy by the pump current. Thereafter, when transistor Q1B makes a transition from the ON state to the OFF state, inductor L1 superposes the stored electromagnetic energy on the discharge current. As a result, average voltage of DC power supplied from converter CONV1 to main positive line MPL and main negative line MNL is boosted by a voltage corresponding to the electromagnetic energy stored in inductor L1 in correspondence with the duty ratio.

The structure and operation of converter CONV2 are similar to those of converter CONV1 above and, therefore, detailed description will not be repeated.

(One-Side Suspended Mode)

Figure 3A:
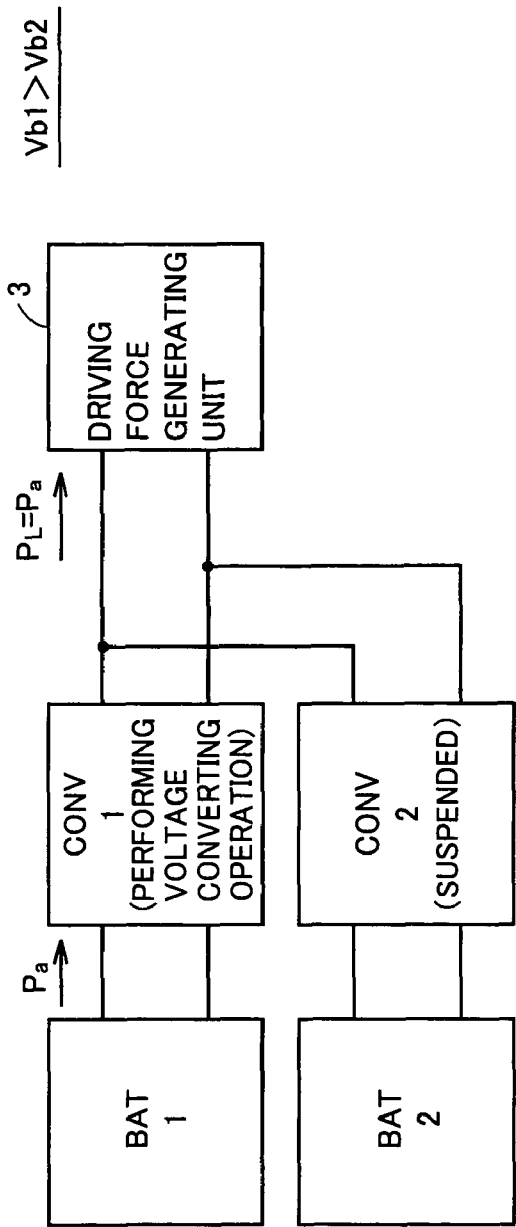
FIGS. 3A and 3B illustrate electric powers to/from a driving force generating unit in a one-side suspended mode.
Figure 3B:
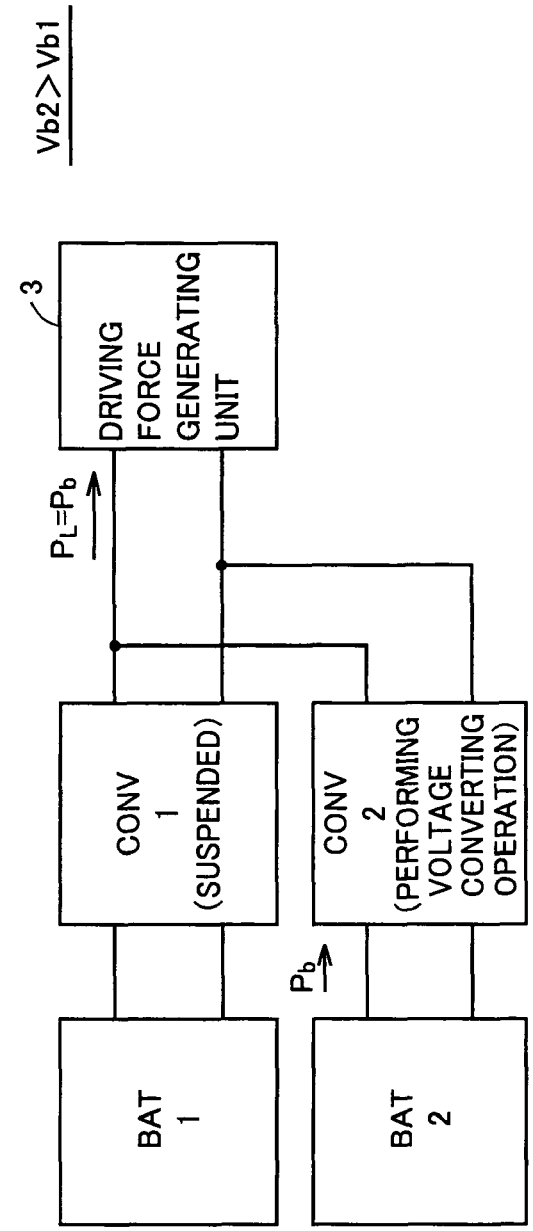

Referring to FIGS. 3A and 3B, the electric power transferred to/from driving force generating unit 3 in the one-side suspended mode will be described.

FIG. 3A shows a state in which the voltage converting operation of converter CONV2 is suspended.

FIG. 3B shows a state in which the voltage converting operation of converter CONV1 is suspended.

Referring to FIG. 3A, immediately after entrance to the one-side suspended mode, if the output voltage value Vb1 of electric storage unit BAT1 is higher than output voltage value Vb2 of electric storage unit BAT2, the voltage converting operation of converter CONV2 is suspended and the voltage converting operation of converter CONV1 is executed. Then, discharge power Pa from electric storage unit BAT1 is supplied though converter CONV1 to driving force generating unit 3.

On the other hand, referring to FIG. 3B, immediately after entrance to the one-side suspended mode, if the output voltage value Vb2 of electric storage unit BAT2 is higher then the output voltage value Vb1 of electric storage unit BAT1, the voltage converting operation of converter CONV1 is suspended, and the voltage converting operation of converter CONV2 is executed. Then, discharge power Pb from electric storage unit BAT2 is supplied thorough converter CONV2 to driving force generating unit 3.

As described above, in the one-side suspended mode, the voltage converting operation of one of the two converters CONV1 and CONV2 is suspended and, therefore, switching loss (power conversion loss) at chopper circuit 40-1 or 40-2 (FIG. 2) can be reduced.

(Control Structure)

Figure 4:
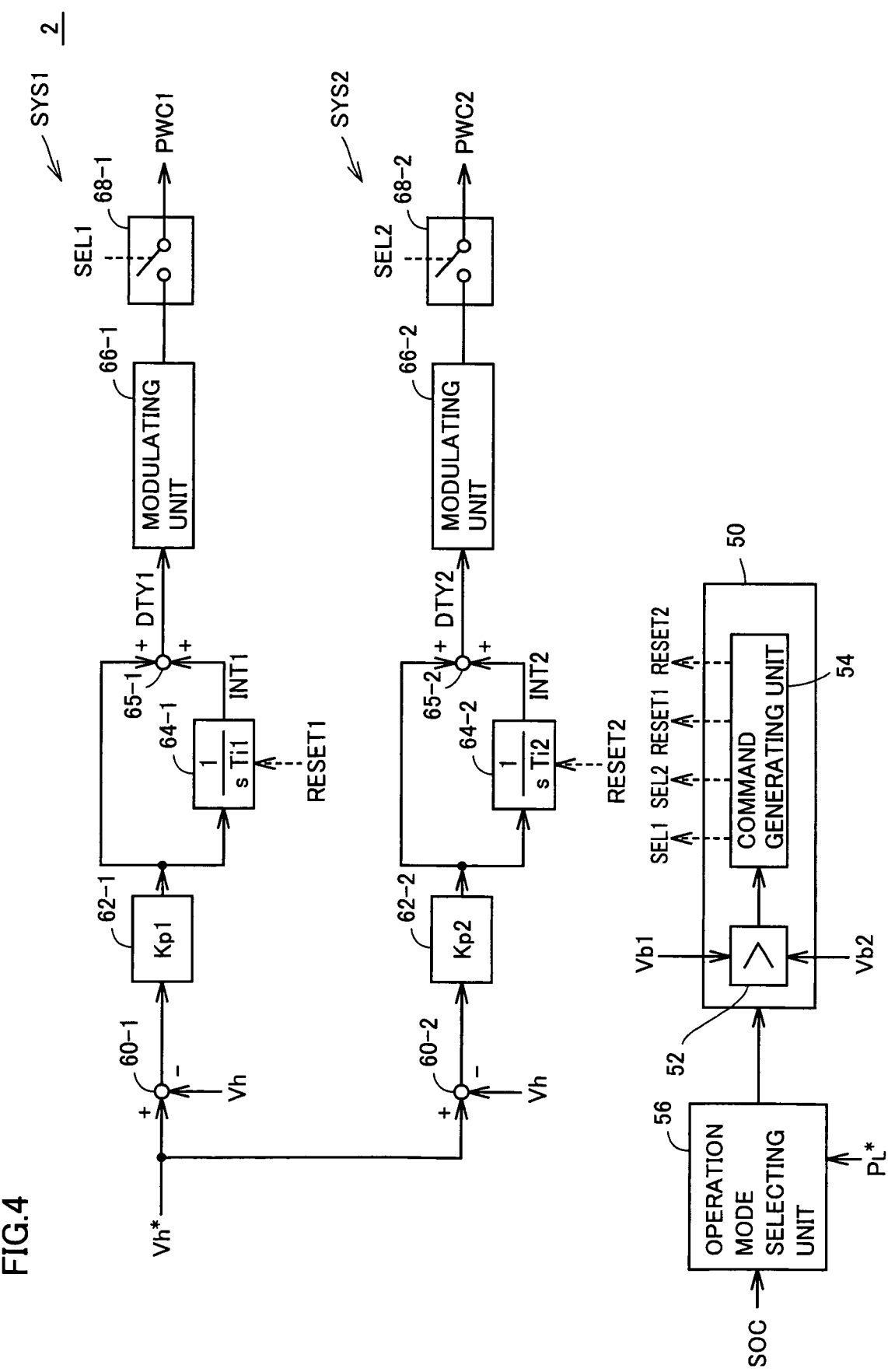
FIG. 4 is a block diagram representing a control structure of a control unit in accordance with the embodiment of the present invention.

Referring to FIG. 4, the control structure in control unit 2 in accordance with the embodiment of the present invention generates switching commands PWC1 and PWC2 for controlling the voltage converting operation (boosting operation) of converters CONV1 and CONV2. Specifically, the control structure in accordance with the embodiment of the present invention includes control systems SYS1 and SYS2, an operation mode selecting unit 56, and a voltage converting operation control unit 50.

Control systems SYS1 and SYS2 correspond to converters CONV1 and CONV2, respectively and, by way of example, generate switching commands PWC1 and PWC2 to make the supply voltage value Vh to driving force generating unit 3 equal to the required voltage value Vh*, respectively. Specifically, control systems SYS1 and SYS2 execute voltage control of output voltages from converters CONV1 and CONV2.

Control system SYS1 includes a subtracting unit 60-1, a proportional element 62-1, an integral element 64-1, an adding unit 65-1, a modulating unit 66-1, and a selecting unit 68-1. Here, subtracting unit 60-1, proportional element 62-1, integral element 64-1, and adding unit 65-1 form a feedback loop for the supply voltage value Vh.

Subtracting unit 60-1 calculates voltage deviation from the difference between required voltage value Vh* and supply voltage value Vh, and outputs it to proportional element 62-1. Proportional element 62-1 has a proportional gain Kp1, and outputs a proportional output obtained by multiplying the voltage deviation received from subtracting unit 60-1 by the proportional gain Kp1 to integral element 64-1 and adding unit 65-1.

Integral element 64-1 corresponds to the history element that outputs a control value determined dependent on the history. Integral element 64-1 has an integration time (or reset time) Ti1, and outputs an integral output INT1 obtained by time-integrating the proportional output received from proportional element 64-1 to adding unit 65-1.

Particularly, in the embodiment of the present invention, integral element 64-1 is formed to allow input of a reset signal RESET1 from the outside. When the reset signal RESET1 is input, integral element 64-1 zero-clears the integral output INT1 stored at that time point. Detailed structure and operation of integral element 64-1 will be described later.

Adding unit 65-1 outputs an operation output DTY1 obtained by adding the proportional output received from proportional element 62-1 and integral output INT1 received from integral element 64-1, to modulating unit 66-1. Specifically, operation output DTY1 is given as Kp1×(1+1/sTi1)×(Vh*−Vh). Here, "s" represents Laplace variable. The operation output DTY1 corresponds to the command value of duty ratio for the chopper circuit 40-1 (FIG. 2) of converter CONV1.

Modulating unit 66-1 compares a carrier wave generated by an oscillating unit, not shown, with the operation output DTY1, generates the switching command PWC1 and outputs it to selecting unit 68-1. In response to a selection command SEL1 received from voltage converting operation control unit 50, selecting unit 68-1 outputs or stops switching command PWC1. Specifically, selecting unit 68-1 outputs the switching command PWC1 in a period activated by selection command SEL1, and outputs "zero" in other periods. Therefore, it follows that the corresponding converter CONV1 performs the voltage converting operation only in the period in which selecting unit 68-1 is activated.

Control system SYS2 includes a subtracting unit 60-2, a proportional element 62-2, an integral element 64-2, an adding unit 65-2, a modulating unit 66-2, and a selecting unit 68-2. Here, subtracting unit 60-2, proportional element 62-2, integral element 64-2, and adding unit 65-2 form a voltage feedback loop for supply voltage value Vh. The system is similar to control system SYS1 and, therefore, detailed description will not be repeated.

Operation mode selecting unit 56 determines whether one-side suspended mode is to be selected or not, dependent on the required power value $P_L^*$ from driving force generating unit 3. If it is possible to select one-side suspended mode, operation mode selecting unit 56 outputs a command to enter the one-side suspended mode, to voltage converting operation control unit 50. Specifically, operation mode selecting unit 56 selects the one-side suspended mode, if the required power value $P_L^*$ is smaller than the tolerable discharge power of each electric storage unit obtained from SOCs of electric storage units BAT1 and BAT2.

In connection with the method of measuring SOCs of electric storage units BAT1 and BAT2, various known means may be used. By way of example, SOC can be operated successively by adding tentative SOC calculated from the output voltage value (open-circuit voltage value) appeared when the electric storage unit is in an open-circuit state to a corrected SOC calculated from the integrated value of output current value.

Receiving the command to enter the one-side suspended mode from operation mode selecting unit 56, voltage converting operation control unit 50 activates only one of selection commands SEL1 and SEL2, in order to select the converter of which voltage converting operation is to be suspended, in accordance with the status values of electric storage units BAT1 and BAT2. Specifically, voltage converting operation control unit 50 includes a comparing unit 52 and a command generating unit 54.

Comparing unit 52 compares output voltage value Vb1 of electric storage unit BAT1 with output voltage value Vb2 of electric storage unit BAT2 as exemplary status values of electric storage units BAT1 and BAT2, and outputs the result of comparison to command generating unit 54.

In accordance with the result of comparison received from comparing unit 52, command generating unit 54 generates selection commands SEL1, SEL2, for selecting the converter that corresponds to the electric storage unit having larger output voltage value. If the result of comparison received from comparing unit 52 changes, command generating unit 54 outputs a reset signal to the integral element of the control system corresponding to the converter of which voltage converting operation is to be resumed, prior to switching of selection command SEL1 or SEL2.

In the present embodiment, operation mode selecting unit 56 corresponds to the "operation mode selecting unit" and voltage converting operation control unit 50 corresponds to the "voltage converting mode control unit."

(Integral Element)

Figure 5A:
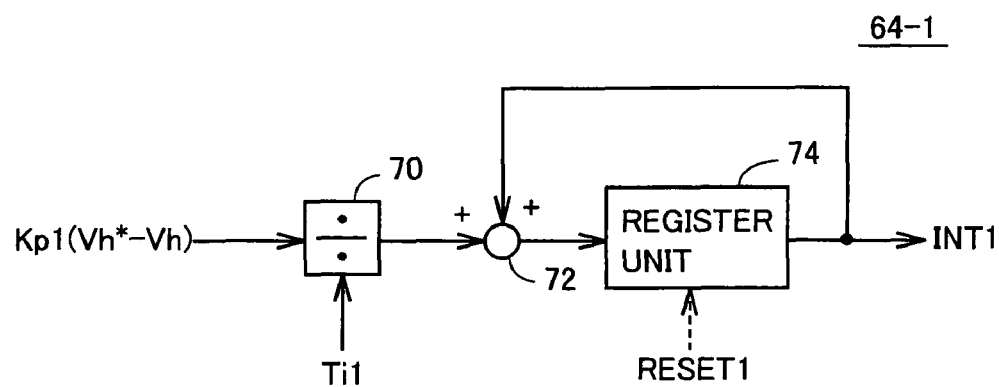
FIGS. 5A and 5B show detailed structure and operation of the integral element.
Figure 5B:
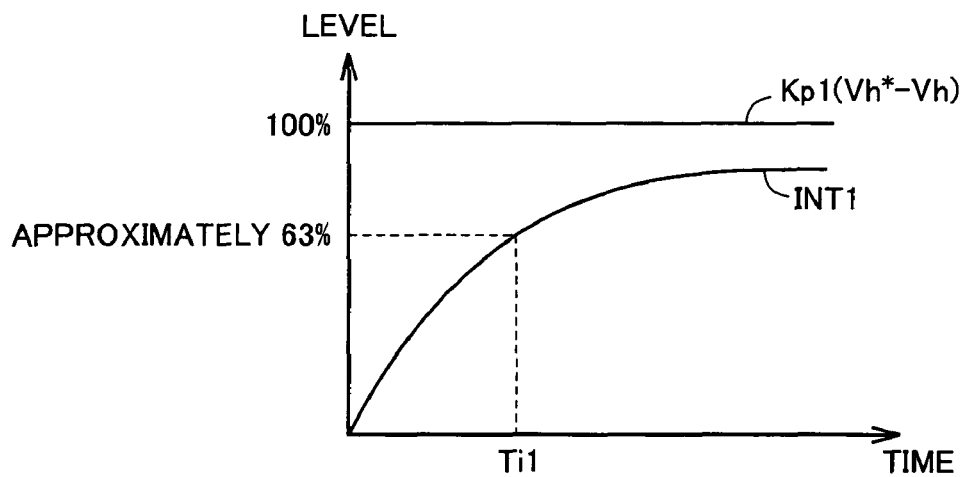

Referring to FIGS. 5A and 5B, the configuration and operation of integral element 64-1 will be described.

FIG. 5A represents the configuration of integral element 64-1, and FIG. 5B represents the operation of integral element 64-1.

Referring to FIG. 5A, integral element 64-1 includes a dividing unit 70, an adding unit 72, and a register unit 74.

Dividing unit 70 divides the proportional output (Kp1 (Vh1*−Vh1)) by integration time Ti1 (division), and outputs the quotient to adding unit 72. Adding unit 72 adds the integral output INT1 (value of last time) output from register unit 74 to the quotient output from dividing unit 70 to generate integral output INT1 (value of present time), and outputs it to register unit 74. Register unit 74 stores the integral output INT1 (value of present time) output from adding unit 72 and outputs the stored integral output INT1 to adding unit 65-1 (FIG. 4) and to adding unit 72.

Referring to FIG. 5B, when stepwise proportional output (Kp1(Vh1*−Vh1)) is applied to integral element 64-1, the integral output INT1 output from integral element 64-1 increases monotonously with a prescribed time constant. The time period after the proportional output is given until the ratio of the level of integral output INT1 to the level of input proportional output attains to about 63% corresponds to the integral time Ti1.

Integral element 64-2 is the same as integral element 64-1 and, therefore, detailed description thereof will not be repeated.

(Integral Output in One-Side Suspended Mode)

Figure 6A:
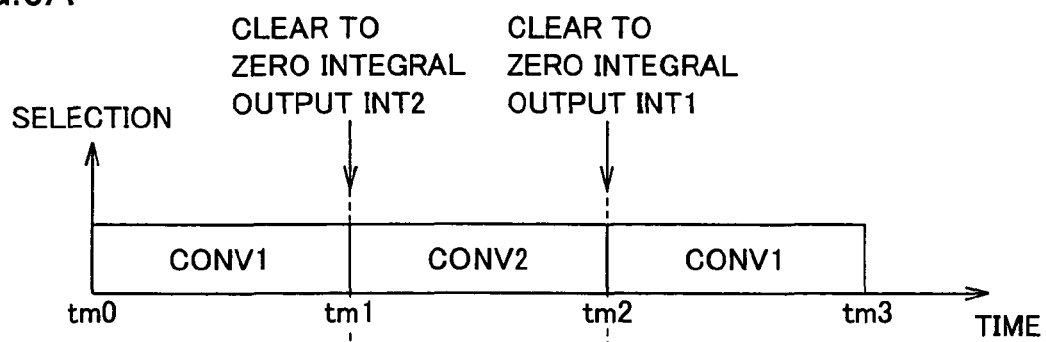
FIGS. 6A to 6C show exemplary changes in the integral output of the integral element in the one-side suspended mode.
Figure 6B:
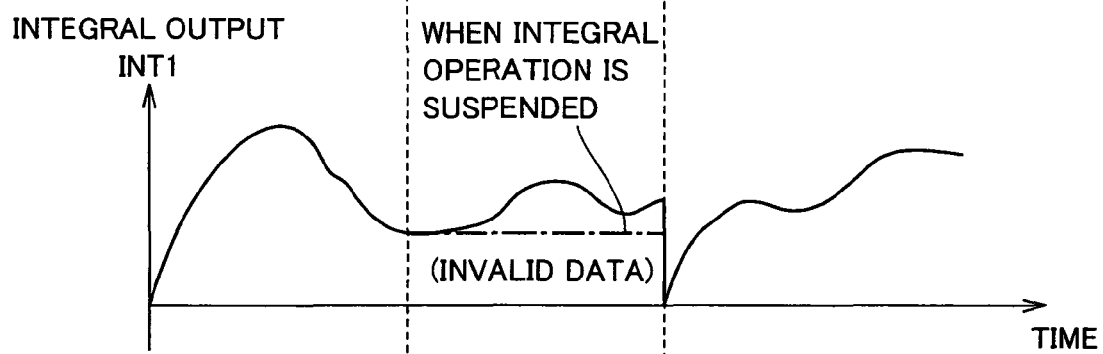
Figure 6C:
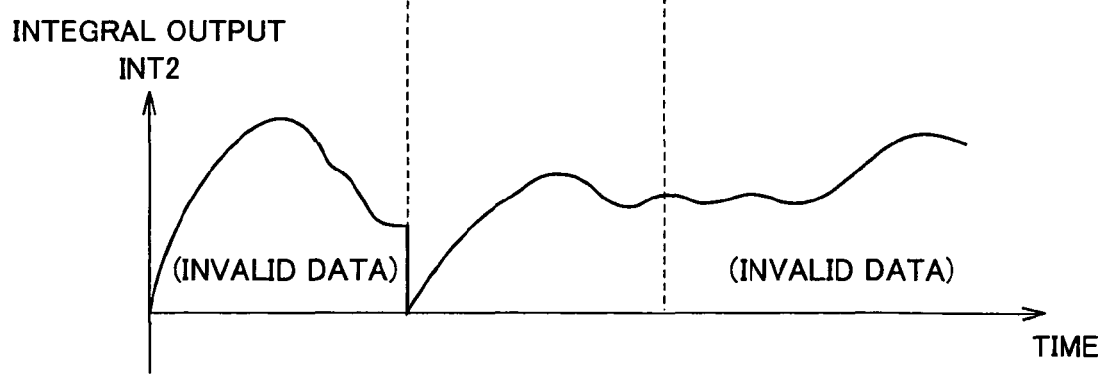

FIGS. 6A to 6C show an example of change in integral outputs INT1 and INT2 of integral elements 64-1 and 64-2. FIG. 6A shows switching of converter that executes the voltage converting operation. FIG. 6B shows temporal change in integral output INT1 output from integral element 64-1. FIG. 6C shows temporal change in integral output INT2 output from integral element 64-2.

Referring to FIG. 6A, as an example, assume that in the one-side suspended mode, the converters for executing the voltage converting operation are switched in the order of converter CONV1, converter CONV2 and converter CONV1.

Referring to FIG. 6B, in a period in which converter CONV1 executes the voltage converting operation (time tm0 to tm1), integral element 64-1 outputs integral output INT1 for controlling the voltage converting operation of converter CONV1. Thereafter, integral element 64-1 continues the integral operation in the period in which converter CONV2 executes the voltage converting operation (time tm1 to tm2). The proportional output integrated in this time period derives from the voltage converting operation of converter CONV2. Specifically, in the period in which converter CONV2 executes the voltage converting operation (time tm1 to tm2), the integral output integrated by integral element 64-1 is invalid data.

Here, at time point tm2 at which converter CONV1 resumes the voltage converting operation, if the invalid integral output were output from integral element 64-1, converter CONV1 would be controlled by a control value not at all relevant. Therefore, as described above, voltage converting operation control unit 50 (FIG. 4) applies a reset signal RESET1 to integral element 64-1, so as to clear to zero the integral output INT1 stored in integral element 64-1.

Referring to FIG. 6C, in the same manner for converter CONV2, voltage converting operation control unit 50 applies a reset signal RESET2 to integral element 64-2 at time point tm1 at which converter CONV2 resumes the voltage converting operation, so as to clear to zero the invalid integral output INT2 stored in integral element 64-2.

In this manner, converters CONV1 and CONV2 can resume the voltage converting operation not influenced by the invalid integral outputs INT1 and INT2 from integral elements 64-1 and 64-2, respectively.

An arrangement may be possible in which while the voltage converting operation by converter CONV1 or CONV2 is suspended, integral operation of integral element 64-1 or 64-2 may be suspended. In such an arrangement, the integral element 64-1 or 64-2 holds the integral outputs immediately before the suspension of voltage converting operation by converter CONV1 or CONV2 and, therefore, at the time point at which the voltage converting operation is resumed, it is necessary to zero-clear the integral outputs INT1 and INT2.

(Process Flow)

Figure 7:
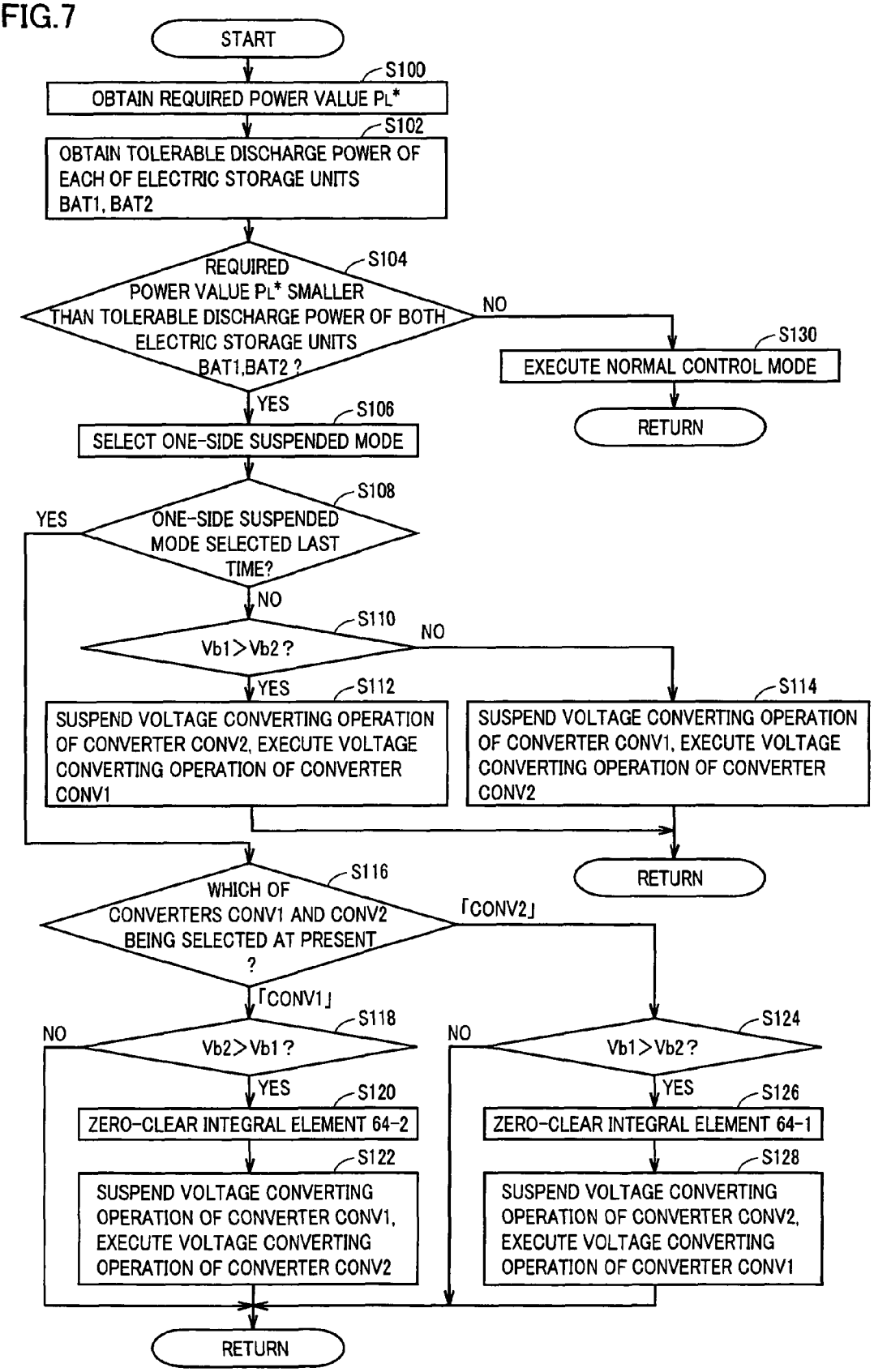
FIG. 7 is a flowchart for implementing the process in accordance with the embodiment of the present invention.

Referring to FIG. 7, the process procedure in accordance with the embodiment of the present invention will be described.

First, control unit obtains the required voltage value $P_L^*$ of driving force generating unit 3 (step S100). Then, based on SOCs of electric storage units BAT1 and BAT2, control unit 2 obtains tolerable discharge power of each of electric storage units BAT1 and BAT2 (step S102). Further, control unit 2 determines whether the required power value $P_L^*$ is smaller than tolerable discharge powers of BAT1 and BAT2 (step S104).

If the required power value $P_L^*$ is smaller than tolerable discharge powers of BAT1 and BAT2 (YES at step S104), control unit 2 selects the one-side suspended mode (step S106). Further, control unit 2 determines whether the one-side suspended mode was selected last time or not (step S108).

If the one-side suspended mode was not selected last time (NO at step S108), that is, the present process immediately follows transition to the one-side suspended mode, control unit 2 determines whether the output voltage value Vb1 of electric storage unit BAT1 is larger than the output voltage value Vb2 of electric storage unit BAT2 or not (step S110).

If the output voltage value Vb1 of electric storage unit BAT1 is larger than the output voltage value VB2 of electric storage unit BAT2 (YES at step S110), control unit 2 suspends the voltage converting operation of converter CONV2, and causes converter CONV1 to execute the voltage converting operation (step S112). Then, control unit 2 returns to the first process step.

If the output voltage value Vb1 of electric storage unit BAT1 is not larger than the output voltage value Vb2 of electric storage unit BAT2 (NO at step S110), control unit 2 suspends the voltage converting operation of converter CONV1 and causes converter CONV2 to execute the voltage converting operation (step S114). Then, control unit 2 returns to the first process step.

If the one-side suspended mode was selected last time (YES at step S108), control unit determines which of converters CONV1 and CONV2 is selected at present (step S116).

If converter CONV1 is selected at present ("CONV1" at step S116), control unit 2 determines whether the output voltage value Vb2 of electric storage unit BAT2 is larger than the output voltage value Vb1 of electric storage unit BAT1 or not (step S118). If the output voltage value Vb2 of electric storage unit BAT2 is larger than the output voltage value Vb1 of electric storage unit BAT1 (YES at step S118), control unit 2 zero-clears the integral element 64-2 corresponding to converter CONV2, in order to switch the converter for executing the voltage converting operation from converter CONV1 to converter CONV2 (step S120). Then, control unit 2 suspends the voltage converting operation of converter CONV1 and causes converter CONV2 to execute the voltage converting operation (step S122). Then, control unit 2 returns to the first process step.

If the output voltage value Vb2 of electric storage unit BAT2 is not larger than the output voltage value Vb1 of electric storage unit BAT1 (NO at step S118), control unit 2 returns to the first process step.

If converter CONV2 is selected at present ("CONV2" at step S116), control unit 2 determines whether the output voltage value Vb1 of electric storage unit BAT1 is larger than the output voltage value Vb2 of electric storage unit BAT2 or not (step S124). If the output voltage value Vb1 of electric storage unit BAT1 is larger than the output voltage value Vb2 of electric storage unit BAT2 (YES at step S124), control unit zero-clears integral element 64-1 corresponding to converter CONV1, in order to switch the converter for executing the voltage converting operation from converter CONV2 to converter CONV1 (step S126). Then, control unit 2 suspends the voltage converting operation of converter CONV2 and causes converter CONV1 to execute the voltage converting operation (step S128). Then, control unit 2 returns to the first process step.

If the required power value $P_L^*$ is not smaller than the tolerable discharge power of BAT1 or BAT2 (NO at step S104), control unit 2 executes the normal control mode (step S130). Then, control unit 2 returns to the first process step. The normal control mode refers to an operation mode in which both converters CONV1 and CONV2 execute the voltage converting operations.

According to the present embodiment, in the one-side suspended mode in which the voltage converting operation of one of the two converters is suspended, at the time when the suspended converter resumes the voltage converting operation, the integral output of the integral element corresponding to the converter is cleared to zero. Consequently, an invalid integral output dependent on the history during the suspension of voltage converting operation is not used for the operation of the control system controlling the resumed voltage converting operation. Therefore, the resumed voltage converting operation can be normalized independent of the state of control of the period in which the voltage converting operation is suspended, and hence, stability of one-side suspended mode can be improved.

[First Modification]

In the embodiment of the present invention described above, an arrangement in which the integral output stored in the integral element included in the control system is cleared to zero has been described. In order to further stabilize the supply voltage to the load device in the one-side suspended mode, an initial value that maintains continuity of voltage converting operations between the converters may be set in the integral element.

The power supply system in accordance with the first modification of the embodiment of the present invention is similar to the power supply system 1 in accordance with the embodiment of the present invention shown in FIG. 1 except for the control structure in the control unit and, therefore, detailed description will not be repeated.

Figure 8:
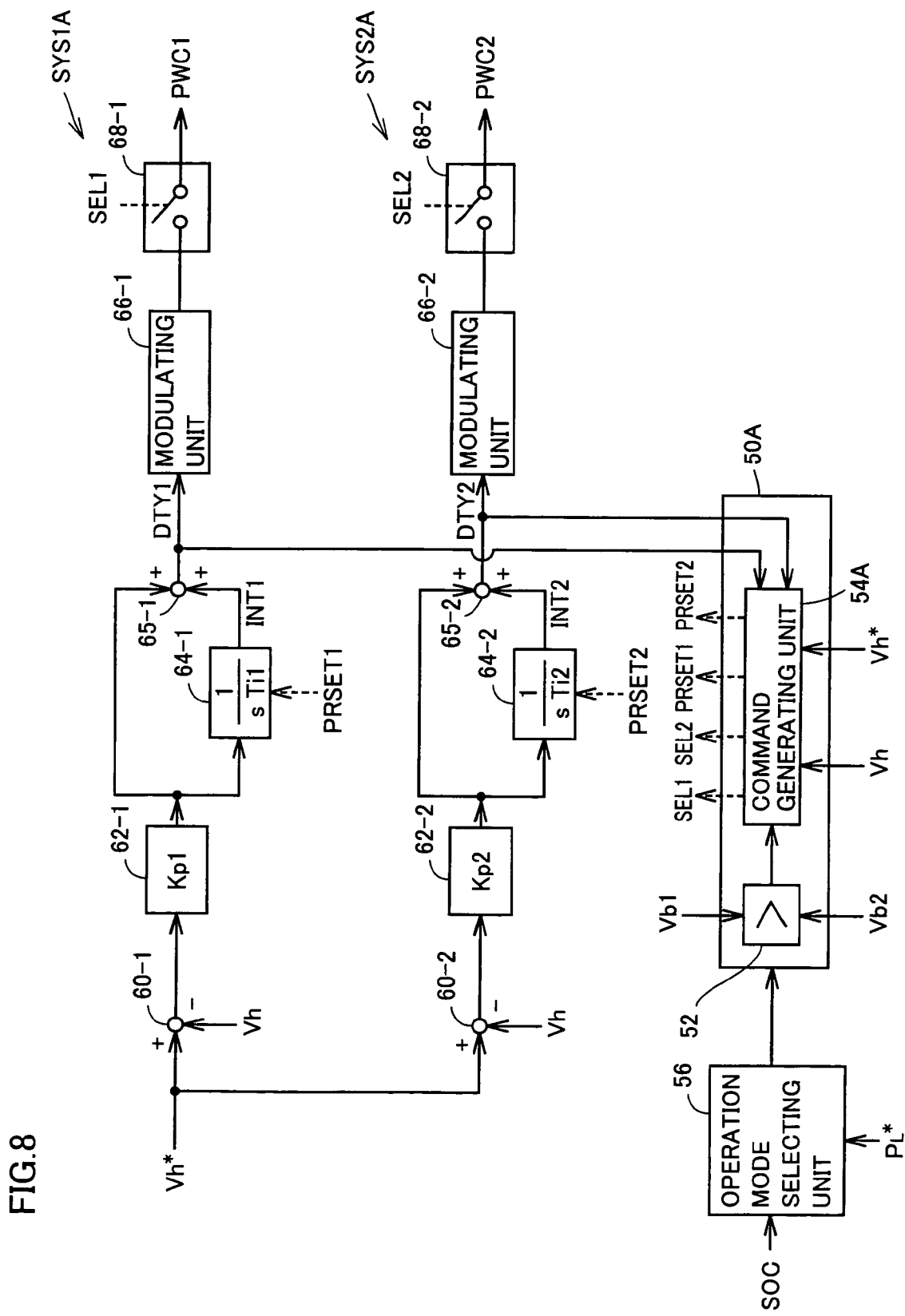
FIG. 8 is a block diagram representing a control structure of a control unit in accordance with a first modification of the embodiment of the present invention.

Referring to FIG. 8, the control structure of control unit 2A in accordance with the first modification of the embodiment of the present invention corresponds to the control structure in accordance with the embodiment of the present invention shown in FIG. 4, in which a voltage converting operation control unit 50A is arranged in place of voltage converting operation control unit 50, and voltage converting operation control unit is adapted to receive operation outputs DTY1 and DTY2. Further, integral elements 64-1 and 64-2 are adapted to receive preset signals PRESET1 and PRESET2, and capable of updating integral outputs INT1 and INT2 stored therein to values corresponding to the preset signals PRESET1 and PRESET2, respectively.

Voltage converting operation control unit 50A corresponds to the voltage converting operation control unit 50 in accordance with the embodiment of the present invention in which a command generating unit 54A is arranged in place of command generating unit 54.

Command generating unit 54A generates, in response to a comparison result of output voltage values received from comparing unit 52, selection command SEL1 or SEL2 for selecting a converter that corresponds to the electric storage unit having larger output voltage value. Further, when the result of comparison received from comparing unit 52 changes, command generating unit 54A outputs the preset signal PRESET1 or PRESET2 for setting a prescribed initial value to the integral element of the control system that corresponds to the converter of which voltage converting operation is to be resumed. The timing for command generating unit 54A to output preset signal PRESET1 or PRESET2 is the same as the timing for command generating unit 54 to output reset signal RESET1 or RESET2 in the embodiment of the present invention described above and, therefore, detailed description thereof will not be repeated.

Except for these points, the control structure of the first modification of the embodiment of the present invention is the same as the control structure in accordance with the embodiment of the present invention described above and, therefore, detailed description thereof will not be repeated.

(Initial Value Determination)

Command generating unit 54A in accordance with the first modification of the embodiment of the present invention determines the initial values to be set in integral elements 64-1 and 64-2, so that continuity between the voltage converting operations of the switched converters can be maintained in the one-side suspended mode.

Figure 9:
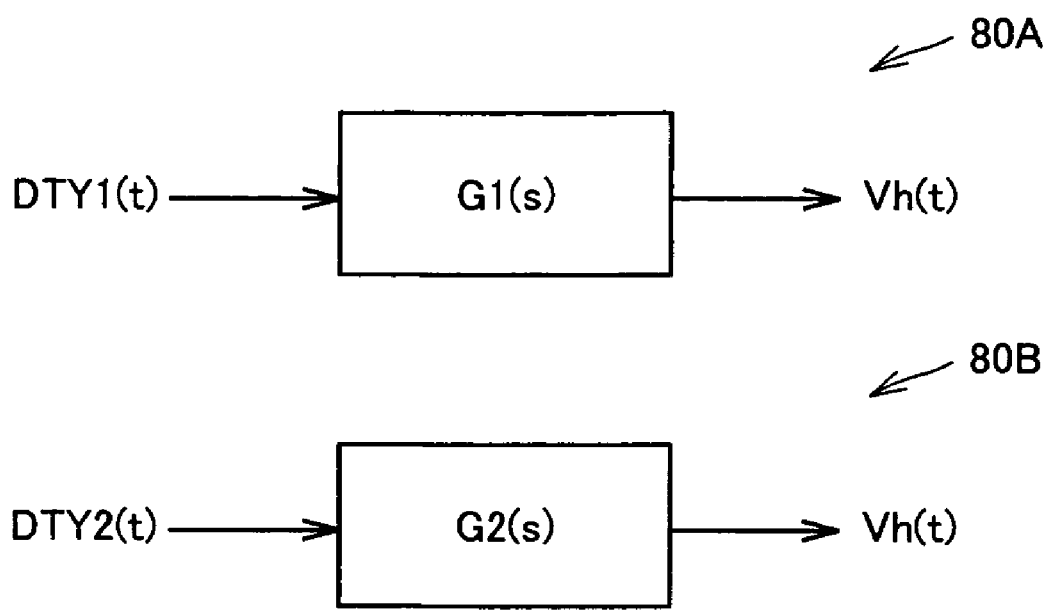
FIG. 9 illustrates a method of determining the initial value in accordance with the first modification of the embodiment of the present invention.

Referring to FIG. 9, the method of determining the initial value in accordance with the first modification of the embodiment of the present invention will be described.

Control blocks 80A and 80B are control blocks representing transfer functions $G1(s)$ and $G2(s)$ of converters CONV1 and CONV2, respectively. Transfer functions $G1(s)$ and $G2(s)$ are transfer functions when operation outputs $DTY1(t)$ and $DTY2(t)$ are given as inputs and supply voltage value Vh as the output voltage of converters CONV1 and CONV2 is given as an output.

In the one-side suspended mode, in order to maintain continuity of voltage converting operation between the switched converters, it is necessary to have the supply voltage value Vh(t) as the output voltage of converters CONV1 and CONV2 consistent before and after the switching. In order to make the supply voltage Vh(t) of control block 80A equal to that of control block 80B, the following relation must be satisfied:

$$G1(s) \times DTY1(t) = G2(s) \times DTY2(t).$$

Here, transfer functions $G1(s)$ and $G2(s)$ can be obtained beforehand from element constants of chopper circuits 40-1 and 40-2 (FIG. 2) forming the converters CONV1 and CONV2, carrier wave frequencies of modulating units 66-1 and 66-2 (FIG. 8) and the like, respectively. Specifically, the initial value of the converter that resumes the voltage converting operation is determined based on the operation output of the other converter and, thus, continuity of voltage converting operation before and after switching can be maintained.

Specifically, when the converter for executing the voltage converting operation is to be switched from converter CONV1 to CONV2, the operation output DTY2(0) to be the initial value can be determined as:

$$\text{operation output } DTY2(0) = G1(s) \times DTY1 / G2(s).$$

When converter for executing the voltage converting operation is to be switched from converter CONV2 to CONV1, the operation output DTY1(0) to be the initial value can be determined as:

$$\text{operation output } DTY1(0) = G2(s) \times DTY2 / G1(s).$$

Further, as described in the embodiment of the present invention, operation outputs DTY1 and DTY2 have the following relations:

$$\text{operation output } DTY1 = Kp1 \times (1 + 1/sTi1) \times (Vh^* - Vh)$$

$$\text{operation output } DTY2 = Kp2 \times (1 + 1/sTi2) \times (Vh^* - Vh).$$

Therefore, if the operation output DTY1(0) or DTY2(0) to be the initial value at the time of converter switching is determined, the initial value to be set to the integral element 64-1 or 64-2 (corresponding to "sTi1" and "sTi2" of the equations above) can be uniquely determined.

In this manner, voltage converting operation control unit 50A determines an initial value that can maintain the continuity of voltage converting operation of converters before and after the switching of converters and sets the value to integral element 64-1 or 64-2 corresponding to converter CONV1 or CONV2.

(Process Flow)

Figure 10:
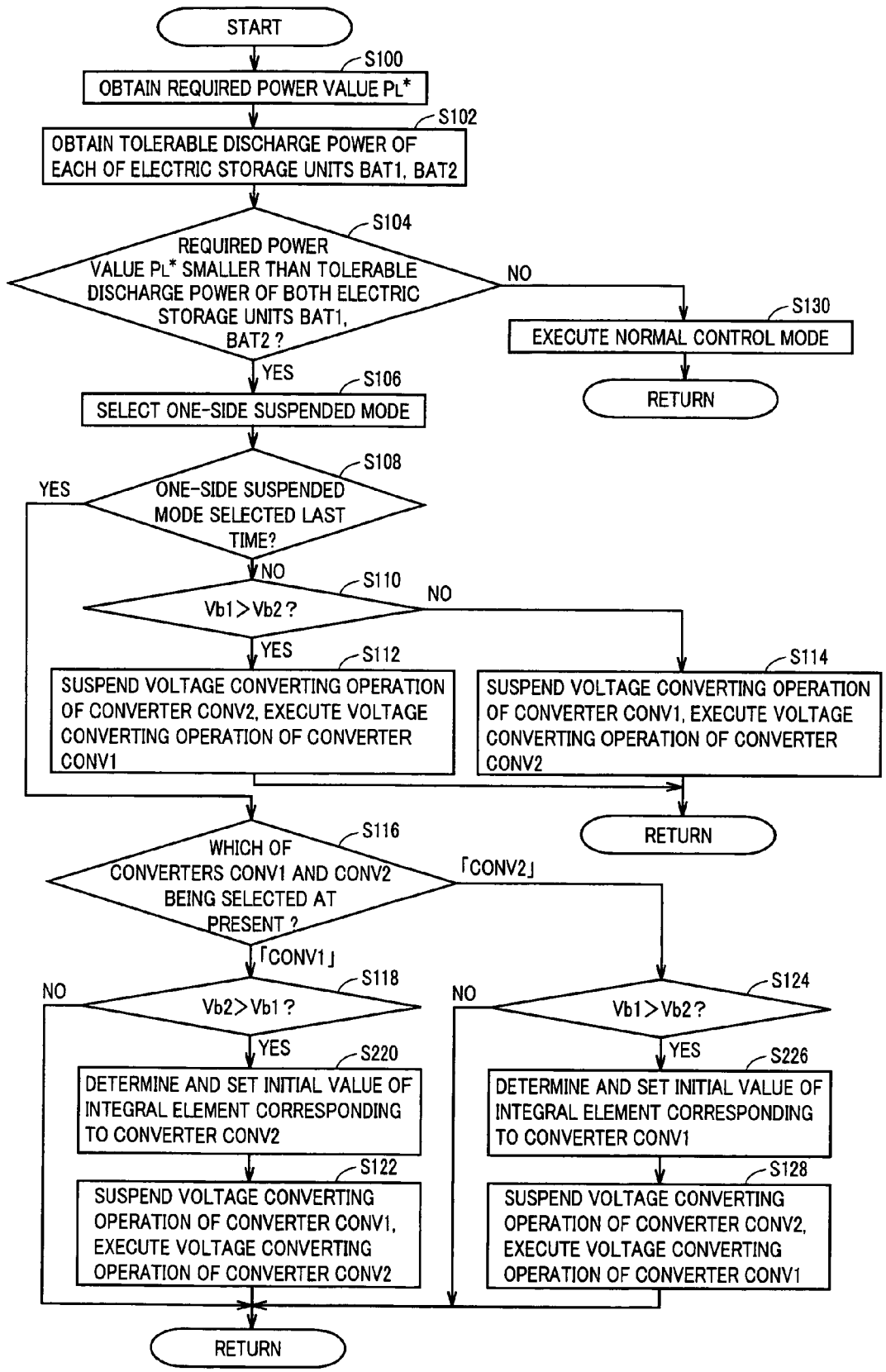
FIG. 10 is a flowchart for implementing the process in accordance with the first modification of the embodiment of the present invention.

Referring to FIG. 10, the process flow in accordance with the first modification of the embodiment of the present invention will be described.

The flowchart implementing the process in accordance with the first modification of the embodiment of the present invention corresponds to the flowchart implementing the process in accordance with the embodiment of the present invention shown in FIG. 7, in which step S220 is taken in place of step S120, and steps S226 is taken in place of step S126.

At step S220, control unit 2A determines the initial value of integral element 64-2 that corresponds to converter CONV2, based on the operation output DTY1 of converter CONV1, in order to maintain continuity at the switching from converter CONV1 to CONV2. Then, control unit 2A sets the determined initial value to integral element 64-2.

Further, at step S226, control unit 2A determines the initial value of integral element 64-1 that corresponds to converter CONV1, based on the operation output DTY2 of converter CONV2, in order to maintain continuity at the switching from converter CONV2 to CONV1. Then, control unit 2A sets the determined initial value to integral element 64-1.

Other steps of the flowchart implementing the process in accordance with the first modification of the embodiment of the present invention are the same as those of the flowchart implementing the process in accordance with the embodiment of the present invention and, therefore, detailed description thereof will not be repeated.

According to the first modification of the embodiment of the present invention, in the one-side suspended mode in which the voltage converting operation of one of the two converters is suspended, when the converter for executing the voltage converting operation is to be switched, the initial value that can maintain continuity of voltage converting operations of the converters is determined, based on an integral output of the integral element corresponding to the preceding converter. The initial value is set to the integral element corresponding to the converter of which voltage converting operation is to be resumed. Thus, at the time of switching the converter for executing the voltage converting operation, supply voltage to the driving force generating unit can further be stabilized. Thus, stability of one-side suspended mode can further be improved.

[Second Modification]

In the embodiment above, a control system including an integral element as a history element has been described. A history element other than the integral element may be used.

The power supply system in accordance with the second modification of the present embodiment is similar to power supply system 1 in accordance with the embodiment of the present invention shown in FIG. 1 except for the control structure in the control unit. Therefore, detailed description will not be repeated.

Figure 11:
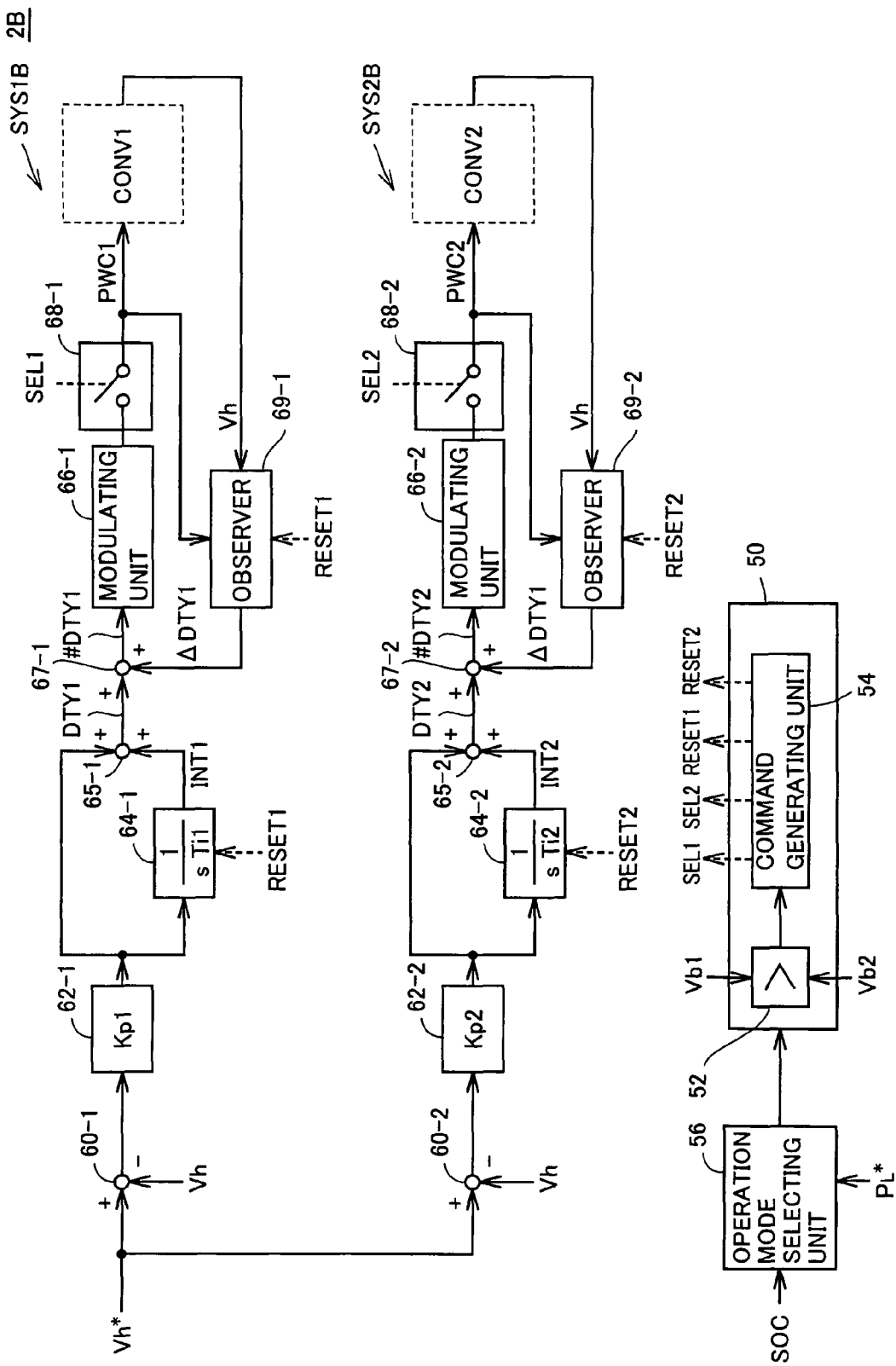
FIG. 11 is a block diagram representing a control structure of a control unit in accordance with a second modification of the embodiment of the present invention.

Referring to FIG. 11, the control structure of a control unit 2B in accordance with the second modification of the embodiment of the present invention includes, in addition to the control structure in accordance with the embodiment of the present invention shown in FIG. 4, adding units 67-1 and 67-2 and observers 69-1 and 69-2. Here, observers 69-1 and 69-2 correspond to learning elements that determine learning values based on the status values of the objects of control.

Observer 69-1 estimates status value of converter CONV1 as the object of control of control system SYS1B, to further stabilize control system SYS1B. Specifically, observer 69-1 estimates disturbance experienced by converter CONV1 as the object of control, and compensates for the operation output DTY1, to offset the estimated disturbance.

Specifically, observer 69-1 calculates an estimated status value of converter CONV1, from a relation between a switching command PWC1 as an input to converter CONV1 and supply voltage value Vh as the output of converter CONV1. Then, observer 69-1 calculates an estimated disturbance value based on a difference from the estimated status value and theoretical status value determined from element constant or the like of chopper circuit 40-1 (FIG. 2) forming the converter CONV1. Further, observer 69-1 calculates an operation compensation amount ΔDTY1 for compensating operation output DTY1 for the estimated disturbance value, and outputs the amount to adding unit 67-1. The operation compensation amount ΔDTY1 corresponds to the learning value of the learning element.

Adding unit 67-1 adds the operation compensation amount ΔDTY1 received from observer 69-1 to the operation output DTY1 received from adding unit 65-1 to generate compensated operation output #DTY1, and outputs the same to modulating unit 66-1.

As described above, observer 69-1 calculates the estimated disturbance value experienced in converter CONV1 from the relation between switching command PWC1 and supply voltage Vh. Therefore, while the voltage converting operation of converter CONV1 is suspended, the estimated disturbance value it calculates would be invalid. Specifically, in the one-side suspended mode, while the voltage converting operation of converter CONV1 is suspended, the switching command PWC1 attains to "zero" while the supply voltage Vh is the same as the output voltage of converter CONV2.

Accordingly, observer 69-1 erroneously estimates that large disturbance is experienced in converter CONV1 and calculates and outputs larger operation compensation amount ΔDTY1 (learning value). Considering such a situation, observer 69-1 is adopted to allow input of reset signal RESET1 from voltage converting operation control unit 50. At the time of switching from converter CONV2 to converter CONV1 (when the voltage converting operation of converter CONV1 is resumed), observer 69-1 receives as an input the reset signal RESET1 and clears to zero the operation compensation amount ΔDTY1 as the learning value to be stored at that time point.

Observer 69-2 and adding unit 67-2 are similar to observer 69-1 and adding unit 67-1, respectively, and therefore, detailed description thereof will not be repeated.

In this manner, converters CONV1 and CONV2 can resume the voltage converting operations not influenced by invalid estimated disturbance value calculated while the voltage converting operation is suspended.

Except for these points, the control structure in accordance with the second modification of the embodiment of the present invention is the same as the control structure in accordance with the embodiment of the present invention described above. Therefore, detailed description thereof will not be repeated.

In the second modification of the embodiment of the present invention, an observer used as an example of the learning element has been described. Similar effects can also be attained when various known control elements for learning control are used.

According to the second modification of the embodiment of the present invention, similar effects as in the embodiment of the present invention described above can be attained even when the observer is included in addition to the integral element as the history element. Therefore, even in a power supply system using various control systems with enhanced controllability, stability of one-side suspended mode can be improved.

[Third Modification]

In the embodiment of the present invention, a power supply system having two electric storage units has been described. The invention, however, is also applicable to a power supply system having three or more electric storage units.

Figure 12:
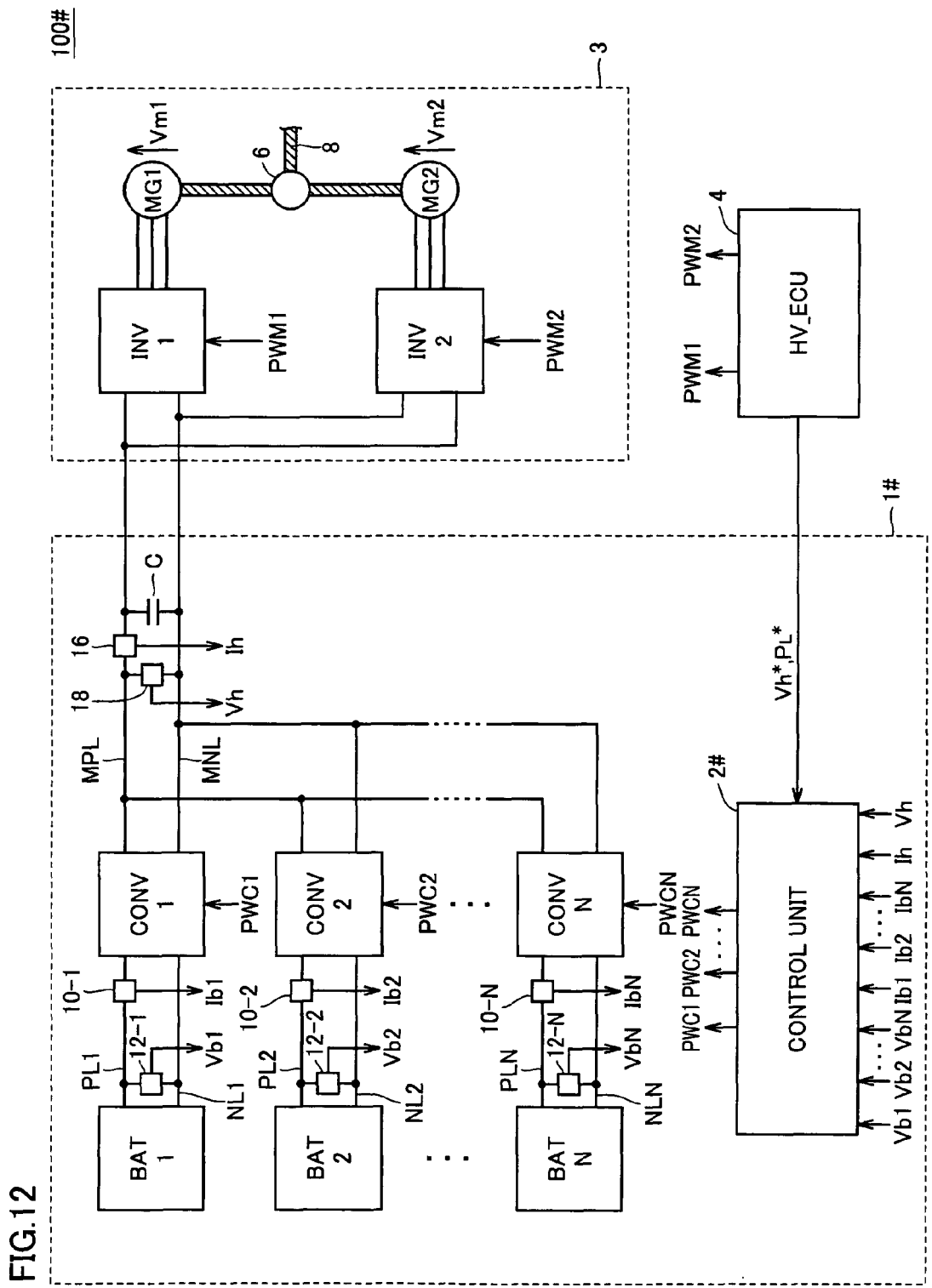
FIG. 12 is a schematic diagram showing a substantial portion of a vehicle provided with the power supply system in accordance with a third modification of the embodiment of the present invention.

Referring to FIG. 12, a schematic structure of a vehicle 100# provided with a power supply systems 1# in accordance with a third modification of the embodiment of the present invention will be described.

A vehicle 100# includes, in place of power supply system 1 of vehicle 100 shown in FIG. 1, the power supply system 1#. Driving force generating unit 3 and HV-ECU4 are the same as those of FIG. 1 and, therefore detailed description thereof will not be repeated.

Power supply system 1# is an extension of power supply system 1 shown in FIG. 1 to N sets. Specifically, in place of converters CONV1 and CONV2, electric storage units BAT1 and BAT2, output current detecting units 10-1 and 10-2 and output voltage detecting units 12-1 and 12-2 of power supply system 1 shown in FIG. 1, power supply system 1# includes an arrangement of converters CONV1 to CONVN, electric storage units BAT1 to BATN, output current detecting units 10-1 to 10-N and output voltage detecting units 12-1 to 12-N, and in place of control unit 2, includes control unit 2#.

Each of converters CONV1 to CONVN, electric storage units BAT1 to BATN, output current detecting units 10-1 to 10-N and output voltage detecting units 12-1 to 12-N is the same as those of the embodiment described above and, therefore, detailed description thereof will not be repeated.

Control unit 2# is formed to allow selection of an operation mode in which the voltage converting operation of at least one converter among converters CONV1 to CONVN is suspended in accordance with the required power value $P_L^*$ from driving force generating unit 3.

In power supply system 1# having three or more electric storage units, it is possible to supply electric power to driving force generating unit 3 if at least one converter performs the voltage converting operation. Therefore, an operation other than the one-side suspended mode can also be selectable. Specifically, the voltage converting operation of any arbitrary converter may be suspended in accordance with the required power value $P_L^*$ from driving force generating unit 3. In such an operation mode, when the voltage converting operation of the suspended converter is to be resumed, control unit 2# clears the history element to zero.

In order that the output voltage of converter immediately after the resumption of voltage converting operation is made equal to the supply voltage value Vh, a prescribed initial value to be set in the history element may be set, based on the supply voltage value Vh before switching.

In this manner, it is possible for converters CONV1 to CONVN to resume the voltage converting operation not influenced by the invalid integral value calculated during suspension of the voltage converting operation.

Figure 13:
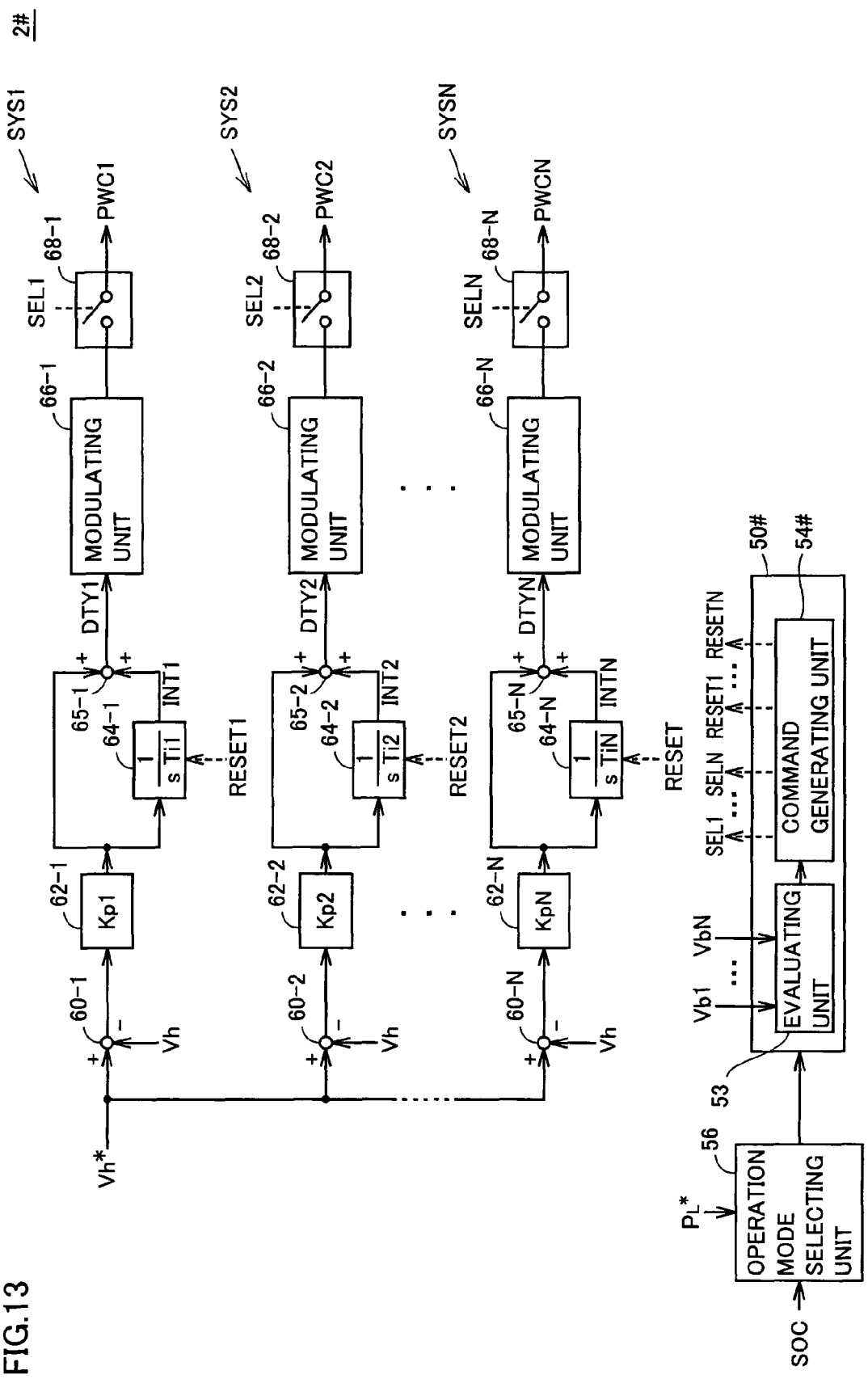
FIG. 13 is a block diagram presenting a control structure of a control unit in accordance with the third modification of the embodiment of the present invention.

Referring to FIG. 13, the control structure of control unit 2# in accordance with the third modification of the embodiment of the present invention corresponds to the control structure of control unit 2 in accordance with the embodiment of the present invention shown in FIG. 2, in which control systems SYS1 and SYS2 are extended to control systems SYS1 to SYSN, and in place of voltage converging operation control unit 50, a voltage converting operation control unit 50# is arranged.

Voltage converting operation control unit 50# controls execution and suspension of voltage converting operation of each of converters CONV1 to CONVN, in accordance with the required power value $P_L^*$ from driving force generating unit 3. Specifically, voltage converting operation control unit 50# includes an evaluating unit 53 and a command generating unit 54#.

Evaluating unit 53 evaluates magnitudes of output voltage values Vb1 to VbN of electric storage units BAT1 to BATN relative to each other, and outputs the result of evaluation to command generating unit 54#.

Command generating unit 54# specifies a converter of which voltage converting operation is to be suspended, in accordance with the result of evaluation of output voltages received from evaluating unit 53, and generates a corresponding selection command SEL1 to SELN. Further, prior to resumption of voltage converting operation by the converter, command generating unit 54# outputs a reset signal to the integral element of the control system that corresponds to the converter.

Except for these points, the control structure in accordance with the third modification of the embodiment of the present invention is the same as the control structure in accordance with the embodiment of the present invention described above. Therefore, detailed description thereof will not be repeated.

According to the third modification of the embodiment of the present invention, even by the power supply system formed of three or more electric storage units and corresponding three or more converters, similar effects as in the embodiment of the present invention can be attained. Therefore, the number of electric storage units and the number of converters can be designed with relatively high degree of freedom, in consideration of rated values of required electric power of load devices and the like.

In the embodiment and modifications of the present invention, a structure in which the driving force generating unit including two motor generators is used as an example of the load device has been described. The number of motor generators, however, is not restricted. Further, as the load device, not only the driving force generating unit generating the vehicle driving force but also a device that consumes power only, or a device capable of both power consumption and power generation, may be used.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A power supply system, having a plurality of rechargeable electric storage units, comprising:
 a power line formed to allow transfer of electric power between a load device and said power supply system;
 a plurality of voltage converting units provided between each of said plurality of electric storage units and said power line, each performing a voltage converting operation between the corresponding said electric storage unit and said power line, each of said plurality of voltage converting units executing said voltage converting operation in accordance with a control system including a history element outputting a control value determined dependent on a previous value of said control value;
 an operation mode selecting unit selecting, in response to a power request from said load device, an operation mode in which the voltage converting operation of at least one voltage converting unit included in said plurality of voltage converting units is suspended; and
 a voltage converting operation control unit controlling execution and suspension of the voltage converting operation of each of said plurality of voltage converting units based on a status value of corresponding one of said electric storage units, when said operation mode is selected; wherein
 said voltage converting operation control unit sets, when said voltage converting operation is to be resumed at the suspended voltage converting unit, a prescribed initial value determined independent from said control value stored in corresponding said history element before resumption, to corresponding said history element.

2. The power supply system according to claim 1, wherein said plurality of voltage converting units includes first and second voltage converting units; and
 said operation mode is a one-side suspended mode in which the voltage converting operation of one of said first and second voltage converting units is suspended and the voltage converting operation of the other is executed.

3. The power supply system according to claim 2, wherein when the voltage converting unit for executing said voltage converting operation is to be switched from said first voltage converting unit to said second voltage converting unit, said voltage converting operation control unit sets, based on said control value stored in said history element corresponding to said first voltage converting unit, said prescribed initial value to said history element corresponding to said second voltage converting element, so that continuity of voltage converting operations by said first voltage converting unit and said second voltage converting unit is maintained before and after the switching.

4. The power supply system according to claim 1, wherein said voltage converting operation control unit clears to zero said control value stored in said history element corresponding to the voltage converting unit that resumes the voltage converting operation.

5. The power supply system according to claim 1, wherein said history element includes an integral element.

6. The power supply system according to claim 1, wherein said history element includes a learning element that determines a learning value based on a status value of an object of control.

7. A vehicle, comprising:
 a power supply system having a plurality of rechargeable electric storage units; and
 a driving force generating unit receiving electric power supplied from said power supply system and generating driving force; wherein
 said power supply system includes;
 a power line formed to allow transfer of electric power between said driving force generating unit and said power supply system,
 a plurality of voltage converting units provided between each of said plurality of electric storage units and said power line, each performing a voltage converting operation between the corresponding said electric storage unit and said power line, each of said plurality of voltage converting units executing said voltage converting operation in accordance with a control system including a history element outputting a control value determined dependent on a previous value of said control value, an operation mode selecting unit selecting, in response to a power request from said driving force generating unit, an operation mode in which the voltage converting operation of at least one voltage converting unit included in said plurality of voltage converting units is suspended; and a voltage converting operation control unit controlling execution and suspension of the voltage converting operation of each of said plurality of voltage converting units based on a status value of corresponding one of said electric storage units, when said operation mode is selected; wherein said voltage converting operation control unit sets, when said voltage converting operation is to be resumed at the suspended voltage converting unit, a prescribed initial value determined independent from said control value stored in corresponding said history element before resumption, to corresponding said history element.

8. The vehicle according to claim 7, wherein said plurality of voltage converting units includes first and second voltage converting units; and said operation mode is a one-side suspended mode in which the voltage converting operation of one of said first and second voltage converting units is suspended and the voltage converting operation of the other is executed.

9. The vehicle according to claim 8, wherein when the voltage converting unit for executing said voltage converting operation is to be switched from said first voltage converting unit to said second voltage converting unit, said voltage converting operation control unit sets, based on said control value stored in said history element corresponding to said first voltage converting unit, said prescribed initial value to said history element corresponding to said second voltage converting element, so that continuity of voltage converting operations by said first voltage converting unit and said second voltage converting unit is maintained before and after the switching.

10. The vehicle according to claim 7, wherein said voltage converting operation control unit clears to zero said control value stored in said history element corresponding to the voltage converting unit that resumes the voltage converting operation.

11. A method of controlling a power supply system having a plurality of rechargeable electric storage units, wherein said power supply system includes a power line formed to allow transfer of electric power between a load device and said power supply system, and a plurality of voltage converting units provided between each of said plurality of electric storage units and said power line, each performing a voltage converting operation between the corresponding said electric storage unit and said power line; and each of said plurality of voltage converting units executes said voltage converting operation in accordance with a control system including a history element outputting a control value determined dependent on a previous value of said control value:

said control method comprising the steps of:

selecting an operation mode in which the voltage converting operation of at least one voltage converting unit included in said plurality of voltage converting units is suspended, in response to a power request from said load device; and controlling execution and suspension of the voltage converting operation of each of said plurality of voltage converting units based on a status value of corresponding one of said electric storage units, when said operation mode is selected; wherein said controlling step includes the step of setting, when said voltage converting operation is to be resumed at the suspended voltage converting unit, a prescribed initial value determined independent from said control value stored in corresponding said history element before resumption, to corresponding said history element.

12. The control method according to claim 11, wherein said plurality of voltage converting units includes first and second voltage converting units; and said operation mode is a one-side suspended mode in which the voltage converting operation of one of said first and second voltage converting units is suspended and the voltage converting operation of the other is executed.

13. The control method according to claim 12, wherein said setting step includes the step of setting, when the voltage converting unit for executing said voltage converting operation is to be switched from said first voltage converting unit to said second voltage converting unit, based on said control value stored in said history element corresponding to said first voltage converting unit, said prescribed initial value to said history element corresponding to said second voltage converting element, so that continuity of voltage converting operations by said first voltage converting unit and said second voltage converting unit is maintained before and after the switching.

14. The control method according to claim 11, wherein said setting step includes the step of clearing to zero said control value stored in said history element corresponding to the voltage converting unit that resumes the voltage converting operation.

* * * * *